(12) United States Patent
Flurscheim et al.

(10) Patent No.: US 10,558,958 B2
(45) Date of Patent: Feb. 11, 2020

(54) CONTACTLESS MESSAGE TRANSMISSION

(71) Applicant: Visa International Service Association, San Francisco, CA (US)

(72) Inventors: Christian Flurscheim, Walnut Creek, CA (US); Erick Wong, Menlo Park, CA (US); Oleg Makhotin, Castro Valley, CA (US)

(73) Assignee: Visa International Service Association, San Francisco, CA (US)

( * ) Notice: Subject to any disclaimer, the term of this patent is extended or adjusted under 35 U.S.C. 154(b) by 665 days.

(21) Appl. No.: 14/279,653

(22) Filed: May 16, 2014

(65) Prior Publication Data

US 2014/0344154 A1 Nov. 20, 2014

Related U.S. Application Data

(60) Provisional application No. 61/824,942, filed on May 17, 2013.

(51) Int. Cl.
| | |
|---|---|
| *G06Q 20/10* | (2012.01) |
| *G06Q 20/40* | (2012.01) |
| *G06Q 20/32* | (2012.01) |
| *G06Q 30/02* | (2012.01) |

(52) U.S. Cl.
CPC ............ *G06Q 20/10* (2013.01); *G06Q 20/322* (2013.01); *G06Q 20/40* (2013.01); *G06Q 30/0238* (2013.01)

(58) Field of Classification Search
CPC ............. G06Q 30/0229; G06Q 20/387; G06Q 20/352; G06Q 20/10; G06Q 30/0238
See application file for complete search history.

(56) References Cited

U.S. PATENT DOCUMENTS

| | | | |
|---|---|---|---|
| 7,703,668 B2 | 4/2010 | Gauthier et al. | |
| 8,046,257 B2 | 10/2011 | Wane et al. | |
| 8,571,937 B2 | 10/2013 | Rose et al. | |
| 2004/0117250 A1* | 6/2004 | Lubow | G06Q 20/342 705/14.17 |
| 2005/0171905 A1* | 8/2005 | Wankmueller | G06Q 20/40975 705/41 |
| 2008/0201226 A1 | 8/2008 | Carlson et al. | |
| 2009/0164380 A1* | 6/2009 | Brown | G06Q 20/341 705/65 |
| 2009/0271211 A1 | 10/2009 | Hammad | |
| 2012/0004972 A1* | 1/2012 | Wengrovitz | G06Q 20/204 705/14.27 |
| 2012/0123847 A1 | 5/2012 | Wane et al. | |
| 2012/0143703 A1* | 6/2012 | Wall | G06Q 20/20 705/16 |
| 2012/0191525 A1 | 7/2012 | Singh et al. | |
| 2012/0271712 A1 | 10/2012 | Katzin et al. | |
| 2013/0046643 A1 | 2/2013 | Wall et al. | |

OTHER PUBLICATIONS

"First Data and PrivaSys Announce Licensing Agreement", Business Wire, Mar. 21, 2007. (Year: 2007).*

* cited by examiner

*Primary Examiner* — Eric T Wong
(74) *Attorney, Agent, or Firm* — Kilpatrick Townsend & Stockton LLP

(57) ABSTRACT

A system and method uses one or more repurposed data fields in a payment transaction message to pass the merchant consumable data from a mobile device to the merchant system using an existing channel. The merchant consumable data relate to loyalty or rewards.

20 Claims, 24 Drawing Sheets

| ACCOUNT IDENTIFIER 402 | EXPIRATION DATE 404 | CRYPTOGRAM 406 | CARD HOLDER NAME 408 | CUSTOMER EXCLUSIVE DATA 410 | ISSUER APPLICATION DATA FIELDS 412 |

FIG. 4B

| ACCOUNT IDENTIFIER 402 | EXPIRATION DATE 404 | CRYPTOGRAM 406 | MERCHANT CONSUMABLE DATA 408 | CUSTOMER EXCLUSIVE DATA 410 | ISSUER APPLICATION DATA FIELDS 412 |

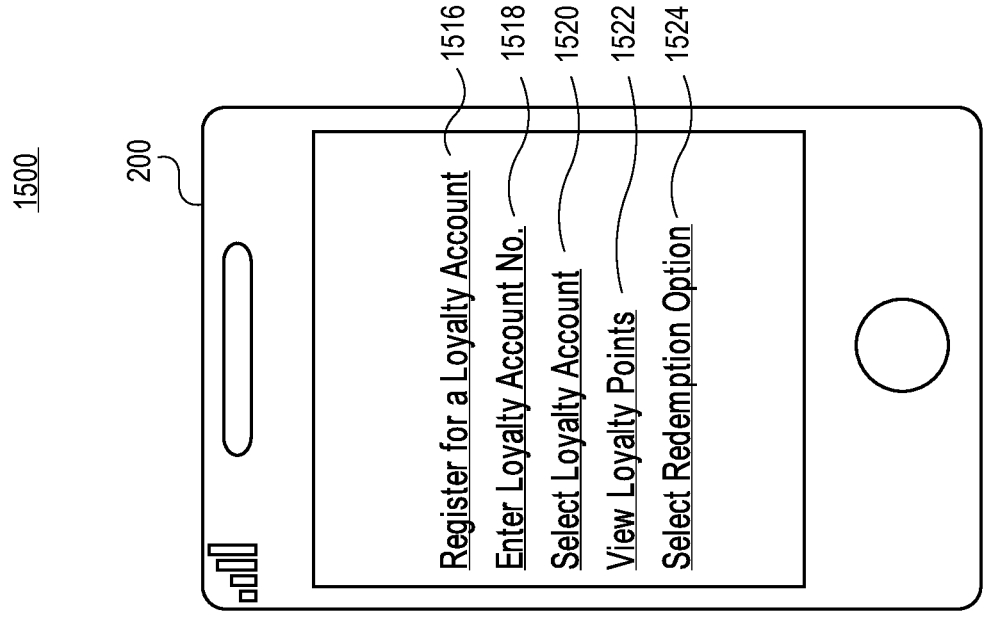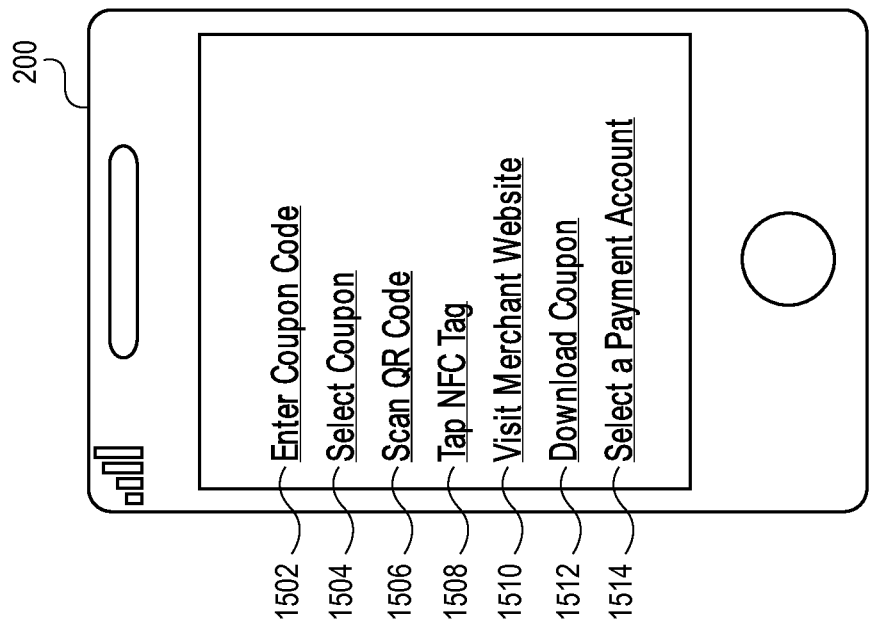
FIG. 15B
FIG. 15A

CONTACTLESS MESSAGE TRANSMISSION

CROSS-REFERENCES TO RELATED APPLICATIONS

This application is a non-provisional application of and claims the benefit of priority of U.S. Provisional Application No. 61/824,942 entitled "Contactless Message Transmission" filed on May 17, 2013, which is herein incorporated by reference in its entirety for all purposes.

BACKGROUND

Coupons are widely used at point of sale terminals. In a typical transaction, a consumer may present a paper coupon to a clerk at a merchant. The clerk may scan the paper coupon at the point of sale terminal. The discount provided by the coupon may be provided at the point of sale and the consumer may then pay the discounted amount to the merchant using a credit or debit card.

With the increasing use of mobile phones as payment devices at points of sale, there is a need to integrate coupons and other types of merchant consumable data. However, doing this would require significant changes at the existing point-of-sale systems.

Embodiments of the invention address these and other problems, individually and collectively.

BRIEF SUMMARY

Embodiments of the invention provide a system and method to utilize an existing payment infrastructure for mobile payment applications to distribute coupons, loyalty data or any other merchant consumable data while minimizing the impact to merchant systems. In some embodiments, one or more data fields of a payment transaction message may be repurposed to pass the merchant consumable data from a mobile device to the merchant system using an existing channel. In some embodiments of the invention, the merchant consumable data may be passed from the mobile device to the merchant system for non-transaction purposes such as loyalty and rewards.

In one embodiment of the invention, a mobile payment device may determine merchant consumable data and may generate a data transfer message comprising a plurality of pre-designated data fields designed to contain data other than the merchant consumable data. The mobile payment device may insert the merchant consumable data into one of the plurality of designated data fields designed to contain data other than the merchant consumable data. The mobile payment device may provide the data transfer message to an access device, wherein the access device is configured to extract the merchant consumable data from the data transfer message and process the merchant consumable data.

One embodiment of the invention is directed to a mobile payment device comprising a processor and a computer readable medium comprising code, executable by the processor, for implementing a method. The method may comprise determining merchant consumable data and generating a data transfer message comprising a plurality of pre-designated data fields designed to contain data other than the merchant consumable data. The method further comprises inserting the merchant consumable data into one of the plurality of designated data fields designed to contain data other than the merchant consumable data. The method further comprises providing the data transfer message to an access device, wherein the access device is configured to extract the merchant consumable data from the data transfer message and process the merchant consumable data.

One embodiment of the invention is directed to a device comprising a processor and a computer readable medium comprising code, executable by the processor, for implementing a method. The method comprises receiving a data transfer message from a mobile payment device, wherein the data transfer message comprises a plurality of pre-designated data fields designed to contain data other than the merchant consumable data, and merchant consumable data in one of the pre-designated data fields. The method further comprises extracting the merchant consumable data and processing the merchant consumable data.

One embodiment of the invention is directed to a system comprising a mobile payment device; and a device comprising a processor and a computer readable medium comprising code, executable by the processor, for implementing a method. The method implemented by the device comprises receiving a data transfer message from a mobile payment device, wherein the data transfer message comprises a plurality of pre-designated data fields designed to contain data other than the merchant consumable data, and merchant consumable data in one of the pre-designated data fields. The method further comprises extracting the merchant consumable data and processing the merchant consumable data.

These and other embodiments of the invention are described in further detail below.

BRIEF DESCRIPTION OF THE DRAWINGS

FIG. 4A illustrates data fields in a portion of a conventional data transfer message.

FIG. 4B illustrates data fields in a portion of a data transfer message according to an embodiment of the invention.

FIGS. 15A-15B illustrate a graphical user interface provided by a mobile application, in one embodiment of the invention.

DETAILED DESCRIPTION

Figure 1:
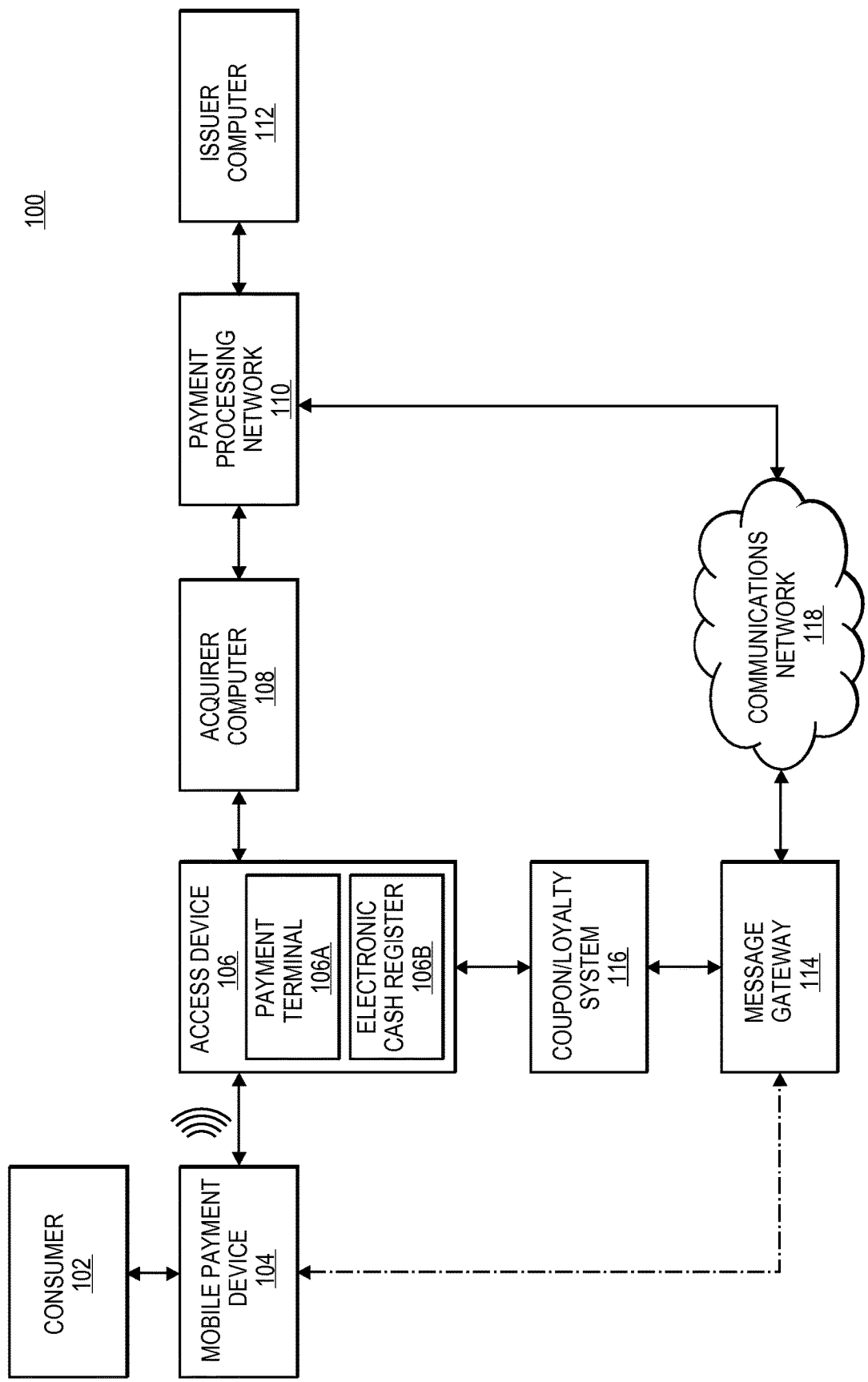
FIG. 1 illustrates a system for contactless payment transactions in one embodiment of the invention.

Embodiments of the invention provide a system and method to utilize an existing payment infrastructure for mobile payment applications to distribute coupons, loyalty data or any other merchant consumable data (MCD) while minimizing the impact to merchant systems. In some embodiments, one or more data fields of a data transfer message (e.g., a payment transaction message) may be repurposed to pass the merchant consumable data from a mobile device to the merchant system using an existing channel. For example, contactless technology based on short range communication standards such as near-field communication (NFC) can enable a consumer (e.g., cardholder) to wave their mobile payment device such as a smart card or a mobile device in proximity to a contactless reader to make a payment for their transaction. Visa® payWave is an example of a contactless technology that can enable mobile payment devices to transmit payment information to a contactless payment terminal such as a Visa® payWave reader.

In some embodiments of the invention, merchant consumable data may be inserted in a data transfer message comprising a plurality of pre-designated data fields designed to contain data other than the merchant consumable data. For example, an existing field in a payWave transaction message such as a "cardholder name" may be repurposed to include merchant consumable data so that the merchant consumable data can be passed to a Visa® payWave reader. Embodiments of the invention may be implemented by limiting the modifications within the Point-of-Sale (POS)/Electronic Cash register (ECR) software and without any modifications in the software/firmware of the contactless reader.

Some embodiments of the invention provide an ability to provision coupons, loyalty data or other merchant defined data to consumer mobile devices via mobile channels, for example, by a payment processing network or a merchant system. Some embodiments of the invention provide ability for the consumers to manually enter the merchant consumable data, for example, a coupon code or loyalty account number into their mobile device to apply towards a transaction. Some embodiments of the invention provide ability for the consumers to store coupons or merchant consumable data on their mobile devices that can be selected before starting a payment process. In some embodiments, merchant consumable data such as coupons may be accessed by scanning a machine readable code on an object, tapping an NFC tag on an object, or downloading the merchant consumable data from a website. In some embodiments, a merchant location or any other merchant specific information may be embedded in the machine readable code or the NFC tag so that the merchant consumable data may be customized based on the merchant location or the merchant specific information (e.g., merchant category code). In some embodiments of the invention, the merchant consumable data may be passed from the mobile device to the merchant system for non-transaction purposes such as loyalty and rewards. Embodiments of the invention provide value to the merchants through the ability to support merchant or third party coupons or loyalty schemes in payment transactions.

Prior to discussing embodiments of the invention, description of some terms may be helpful in understanding embodiments of the invention.

A "mobile payment device" may include a mobile device that may be associated with a payment account. For example, in some embodiments, the mobile payment device is a payment card or a mobile phone. In some embodiments, the mobile payment device may include an embedded computer chip that can securely store payment account information associated with a consumer. The payment account information may be a payment account number and an expiration date. In some embodiments, the mobile payment device may include an antenna to communicate with a contactless reader that uses radio waves, e.g., to transmit payment information to a merchant access device to conduct a transaction. For example, the information stored on the computer chip can be read by a contactless reader at the point-of-sale based on a contactless technology such as Near Fields Communications (NFC), e.g., when the mobile payment device is brought in close proximity of the reader (e.g., within few inches).

"Merchant consumable data" may include data that may be consumed or used by a merchant. In some embodiments, the merchant consumable data may include coupon data, loyalty data or other merchant defined data that may or may not be used in a transaction. In some embodiments, the merchants can provision the merchant consumable data to mobile payment devices via a mobile channel.

A "data transfer message" may include a message for transferring data. For example, in some embodiments, a data transfer message may include a message to transfer data for a payment transaction from a consumer device (e.g., mobile payment device) to a merchant device (e.g., access device). In some embodiments, a data transfer message may include a plurality of pre-designated data fields. For example, the data fields may correspond to an account identifier, an expiration date, a cryptogram, a cardholder name, consumer exclusive data, issuer application data and any other data suitable for the payment transaction. In embodiments of the invention, one of the pre-designated data fields of the data transfer message may be repurposed to insert the merchant consumable data.

"Pre-designated data fields" may include data fields in a message that are designated to contain type of data. For example, a cardholder name data field may be configured to contain a number of a cardholder, an expiration date data field may be configured to hold an expiration date of a payment account, a service code field may be designated to hold a service code, a dCVV data field may be designated to hold a dCVV value, etc.

An "access device" may include a device that may be configured to communicate with a mobile payment device. In some embodiments, the access device may include a payment terminal and an electronic cash register coupled to the payment terminal. In another embodiment, the access device may include only a payment terminal. In some embodiments, a payment terminal may include a reader such as a contactless reader. For example, the contactless reader may be configured to read payment information from a mobile payment device based on a short range communications standard such as NFC. In some embodiments, the access device may be associated with a Point-of-Sale (POS) of a merchant system.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

FIG. 1 illustrates a system 100 for contactless payment transactions in one embodiment of the invention.

The system 100 may include a mobile payment device 104 associated with a consumer 102, an access device 106, an acquirer computer 108, a payment processing network 110, an issuer computer 112, a message gateway 114, a coupon/loyalty system 116 and a communications network 118. The mobile payment device 104, the access device 106, the acquirer computer 108, the payment processing network 110, and the issuer computer 112 may be in communication with each other and may process conventional credit and debit card transactions.

The consumer 102 may be an individual or a person who is able to use the mobile payment device 104 to pay for a transaction, is able to register in a loyalty program with a merchant and is able to interact using a user interface on the mobile device using any of the methods described in accordance with embodiments of the invention.

The mobile payment device 104 may have any suitable form. For example, a mobile payment device 104 may be a payment card (e.g., a credit card, a debit card, a prepaid card, a loyalty card, a gift card, etc.) or a portable electronic device (e.g., a mobile phone, a tablet, a notebook, a PDA, a laptop, a netbook, a key fob, etc.). In some embodiments, the mobile payment device 104 may include a computer chip that can securely store payment account information such as a payment account number and an expiration date associated with the consumer 102. For example, the payment account may be issued by the issuer computer 112. In some embodiments, the mobile payment device 104 may include an antenna to interact with the access device 106, e.g., using radio waves. The mobile payment device 104 may be configured to transmit a data transfer message including the payment information to the access device 106 via the antenna when the mobile payment device 104 is in close proximity of the access device 106. For example, the mobile payment device 104 may be waved or tapped at a contactless reader of the access device 106. However, for the purposes of explaining the embodiments of the invention, it will be assumed that the mobile payment device 104 is a mobile phone.

In some embodiments, a mobile application on the mobile payment device 104 may provide a user interface on the mobile payment device 104. For example, the consumer 102 may utilize the user interface to enter coupon or loyalty data, select coupons provisioned by a merchant, select a loyalty account, select a payment application, etc. In some embodiments, the mobile application may be configured to read a machine readable code (e.g., QR™ code) scanned using the mobile payment device 104 or configured to read code from an NFC tag tapped by the mobile payment device 104. The machine readable code or the NFC tag may represent a coupon that may be redeemable at a merchant. As will be explained in further detail below, once in the mobile payment device, the coupon may be inserted in a data transfer message transmitted from the mobile payment device 104 to the access device 106. The access device 106 may apply the coupon to a transaction amount for a transaction that the consumer is currently conducting. In some embodiments, the merchant location and/or the merchant specific information may be used to provision customized coupons to the mobile payment device 102 for the transaction. For example, the mobile application may download relevant merchant consumable data from a cloud server (e.g., associated with a payment processing network) based on the merchant location and/or the merchant specific information, and may customize menu selection based on the merchant consumable data. For example, a retail chain store in one location may sell furniture and in another location may not sell furniture. Depending on the merchant location, a customized menu may or may not include a selection for a coupon for furniture.

In some embodiments, the mobile application may enable the consumer 102 to make a payment for a transaction using the mobile payment device 104. For example, payment account information associated with the consumer 102 may be stored in a secure element on the mobile portable device 102 and may be accessed using the mobile application. The mobile application may then generate a data transfer message comprising a plurality of data fields. The mobile application may then insert merchant consumable data in one of the pre-designated data fields of the data transfer message. In some embodiments, the mobile payment device 104 may include a separate mobile payment application for accessing payment account information associated with the consumer 102.

In some embodiments, the mobile application may be associated with the payment processing network 110 or the issuer computer 112. In some embodiments, the mobile application may be a wallet application or associated with a wallet application.

The access device 106 may include a payment terminal 106A and an electronic cash register 106B. The electronic cash register 106B may be coupled to the payment terminal 106A. In some embodiments, the payment terminal 106A may include a contactless reader. The payment terminal 106A may read the data transfer message transmitted by the mobile payment device 104 using the contactless reader. For example, the contactless reader may include RF (radio frequency) antennas to interact with the mobile payment device 104, e.g., when the mobile payment device 104 is waved in close proximity of the contactless reader of the payment terminal 106A or tapped at the contactless reader. The electronic cash register 106B may be configured to extract the merchant consumable data from the data transfer message and insert the merchant consumable data in an MCD message for transmission to the loyalty/coupon system 116. The electronic cash register 106B may also be configured to determine an authorization amount for the transaction and to generate an authorization request message based on the validity of the merchant consumable data as determined by the loyalty/coupon system 116. For example, if the electronic cash register 106B receives a message from the loyalty/coupon system 116 indicating that the merchant consumable data includes a valid coupon for a 10% discount on the transaction amount, then the electronic cash register 106B may subtract the corresponding amount from the transaction amount to generate an authorization amount. The payment terminal 106A may be configured to generate an authorization request message with the authorization amount that may be transmitted to the acquirer computer 108.

The acquirer computer 108 may be associated with an acquirer. The acquirer is typically a system for an entity (e.g., a bank) that manages an account for a particular merchant or other entity. The acquirer computer 108 may route the authorization request message for the transaction to the issuer computer 112 via the payment processing network 110.

The payment processing network 110 may include data processing subsystems, networks, and operations used to support and deliver authorization services, and clearing and settlement services. An example of payment processing network 110 includes VisaNet®, operated by Visa®. The payment processing network 110 may include wired or wireless network, including the internet. The payment processing network 110 may forward the authorization request message to the issuer computer 112.

In some embodiments, the payment processing network 110 may be configured to authenticate the merchant consumable data. For example, the consumer 102 may access the merchant consumable data by scanning a machine readable code on an object (e.g., a poster), tapping an NFC tag on an object (e.g., a product for sale), or by downloading it from a merchant website (not shown) using the mobile payment device 104. In some embodiments of the invention, the payment processing network 110 may be configured to provision coupons to the mobile payment device 104 via the mobile application and the message gateway 114 and the communications network 118. In some embodiments of the invention, the merchant consumable data may be authenticated by the payment processing network 110 before the mobile application inserts the merchant consumable data into one of the data fields of the data transfer message. For example, a machine readable code, an NFC tag or a downloadable coupon may not be genuine and may have been counterfeited. By authenticating the coupons, such counterfeiting fraud may be prevented. For example, the merchant consumable data may be authenticated using a digital signature, a cryptogram or any other suitable method of verification.

The communications network 118 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In some embodiments, the payment processing network 110 may include a server computer comprising a processor and a computer readable medium coupled to the processor. The computer readable medium may include instructions that may be executed by the processor to perform some embodiments of the invention.

The issuer computer 112 may be associated with an issuer. The issuer is typically a business entity (e.g., a bank) that may have issued the payment account associated with the mobile payment device 104. Some systems can perform both issuer and acquirer functions. When a transaction involves a payment account associated with the issuer computer 112, the issuer computer 112 may verify the account and respond with an authorization response message to the acquirer computer 108 via the payment processing network 110 that may forward it to the access device 106. The authorization response message may include an identifier to describe whether the transaction was approved or declined. The access device 106 may communicate to the consumer 102 about the outcome of the authorization based on the authorization response message.

The coupon/loyalty system 116 may be communicatively coupled to the access device 106 via a communications network (not shown) such as the Internet. In some embodiments, the coupon/loyalty system 116 may be configured to provision coupon or loyalty data to the mobile payment device 104 via the message gateway 114. The coupon/loyalty system 116 may include a server computer comprising a processor and a memory. The coupon/loyalty system 116 may be configured to receive an MCD message from the access device 106 and may provide a response message to the access device 106. In some embodiments, the response message to the access device 106 may include an indication whether the coupon is valid. For example, the coupon/loyalty system 116 may determine the validity of the coupon based on the expiration date of the coupon and/or if the coupon can be used by the designated user. In some embodiments, the coupon/loyalty system 116 may determine if the coupon is associated with the merchant. In some embodiments, when the coupon/loyalty system 116 receives a loyalty account number in the merchant consumable data, the coupon/loyalty system 116 may determine the validity of the loyalty account based on a set of rules. For example, the coupon/loyalty system 116 may determine if the loyalty account is associated with the merchant, number of points or rewards associated with the loyalty account, expiration date of the points or rewards, whether the transaction qualifies for the redemption of the loyalty points, etc.

Figure 2:
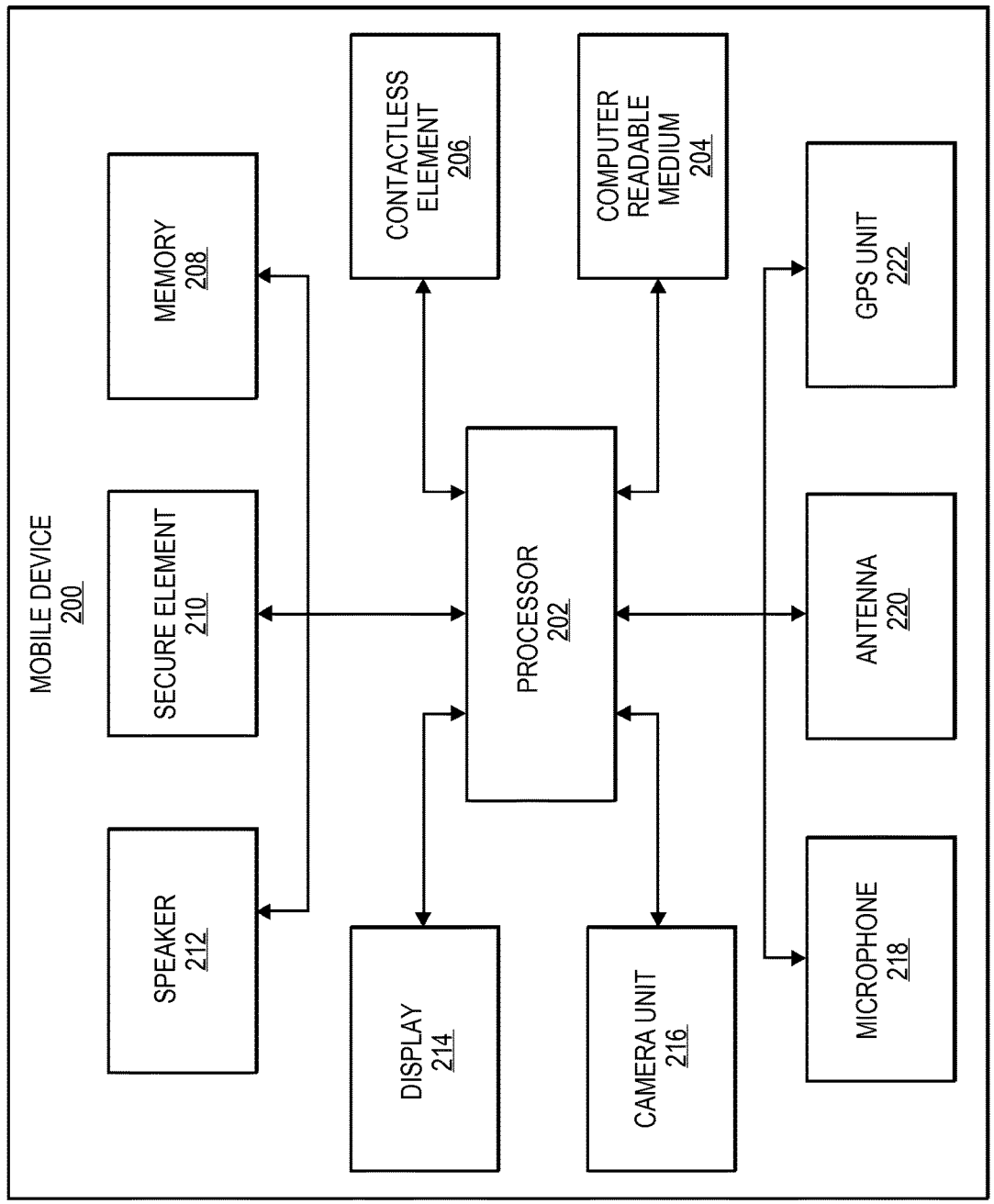
FIG. 2 illustrates some components of a mobile device in one embodiment of the invention.

FIG. 2 illustrates components of a mobile device 200 in one embodiment of the invention.

The mobile device 200 may include a processor 202 or processing elements that may be configured to execute instructions or code in order to implement methods, processes or operations. The processor 202 may be communicatively coupled to a computer readable medium 204, a contactless element 206, a memory 208, a secure element 210, a speaker 212, a display 214, a camera unit 216, a microphone 218, an antenna 220, and a GPS unit 222. In some embodiments of the invention, the mobile payment device 104 is the mobile device 200.

The computer readable medium (CRM) 204 may comprise code executable by the processor 202 for implementing methods using embodiments of the invention. The CRM 204 may be in the form of a memory that stores data and could be internal to the mobile device 200 or hosted remotely (i.e., cloud) and accessed wirelessly by the mobile device 200. In some embodiments, the CRM 204 may include non-volatile, non-writable storage area (e.g., Flash ROM) where the firmware/operating system may reside. Non-volatile memory is memory that can retain the stored information even when not powered. Examples of non-volatile memory include read-only memory (see ROM), flash memory, most types of magnetic computer storage devices (e.g. hard disks, floppy discs and magnetic tape), optical discs, etc.

The contactless element 206 may typically be implemented in the form of a semiconductor chip (or other data storage element) with an associated wireless data transfer element such as an antenna. The contactless element 206 may be configured to exchange data and/or control instructions based on a short range communications capability, such as RFID, Bluetooth™, infra-red or any other suitable near fields communications (NFC) capability. In some embodiments of the invention, a data transfer message comprising a plurality of data fields may be transmitted using the contactless element 206 when the consumer 102 starts the payment process using the mobile application.

The memory 208 may be internal to the mobile device 200 or hosted remotely (i.e., cloud) and accessed wirelessly by the mobile device 200. In some embodiments, the memory 208 may be configured as a volatile run-time memory and/or a cache. Volatile memory is memory that requires power to maintain the stored information (e.g., SRAM, DRAM, etc.). In some embodiments, the memory 208 may be used to store merchant consumable data such as coupons.

The secure element 210 may be implemented as a separate secure smart card chip, in a SIM/UICC (Subscriber Identity Module/Universal Integrated Circuit Board), embedded in the mobile device 200, or in a removable card (e.g., Secure Digital card). The secure element 210 may be configured to securely store applications (e.g., payment application), data (e.g., Personal Identification Information (e.g., consumer name, address, phone number, date-of-birth, etc.), Personal Account Information (account number, expiration date, CVV, dCVV, etc.), cryptographic keys, etc.) and provide for secure execution of applications.

The display 214 may allow a user to view text, numbers, multimedia, and other information. In some embodiments, a graphical user interface may be provided on the display 214 for the consumer 102 to enter coupon or loyalty data. In some embodiments, the graphical user interface may provide a menu for the consumer 102 to select a coupon or a loyalty account number. In some embodiments, the display 214 may include a touch screen interface for the consumer 102 to interact with the mobile device 200 using the touch screen. In some embodiments, the consumer 102 may use a keypad (not shown) instead of or in addition to the touch screen interface to enter data into the mobile device 200.

The camera unit 216 may be utilized by the consumer 102 to scan a machine readable code such as a QR™ code. For example, the user may scan a QR™ code that includes merchant consumable data. In some embodiments, the user may scan a machine readable code that may include a merchant location and/or other merchant specific information that may be used by the mobile device 200 to retrieve relevant coupons from a cloud server (not shown) that may be presented to the consumer 102 to apply towards a payment transaction. In some embodiments, the cloud server may be associated with the payment processing network 110, for example, via the message gateway 114.

The GPS unit 222 may be utilized to determine a location of the mobile device 200. It will be understood that other methods of determining location such as network based positioning (e.g., using the antenna 220 coupled to the mobile device 200) or a hybrid positioning system may be used. Some other non-limiting examples to determine the location of the mobile device 200 may include handset based, SIM-based or WiFi based device tracking. In some embodiments, relevant coupons may be retrieved by the mobile application based on the location of the mobile device 222.

The speaker 212 and microphone 218 may be configured to allow the user hear and transmit voice respectively through the mobile device 200.

Figure 3:
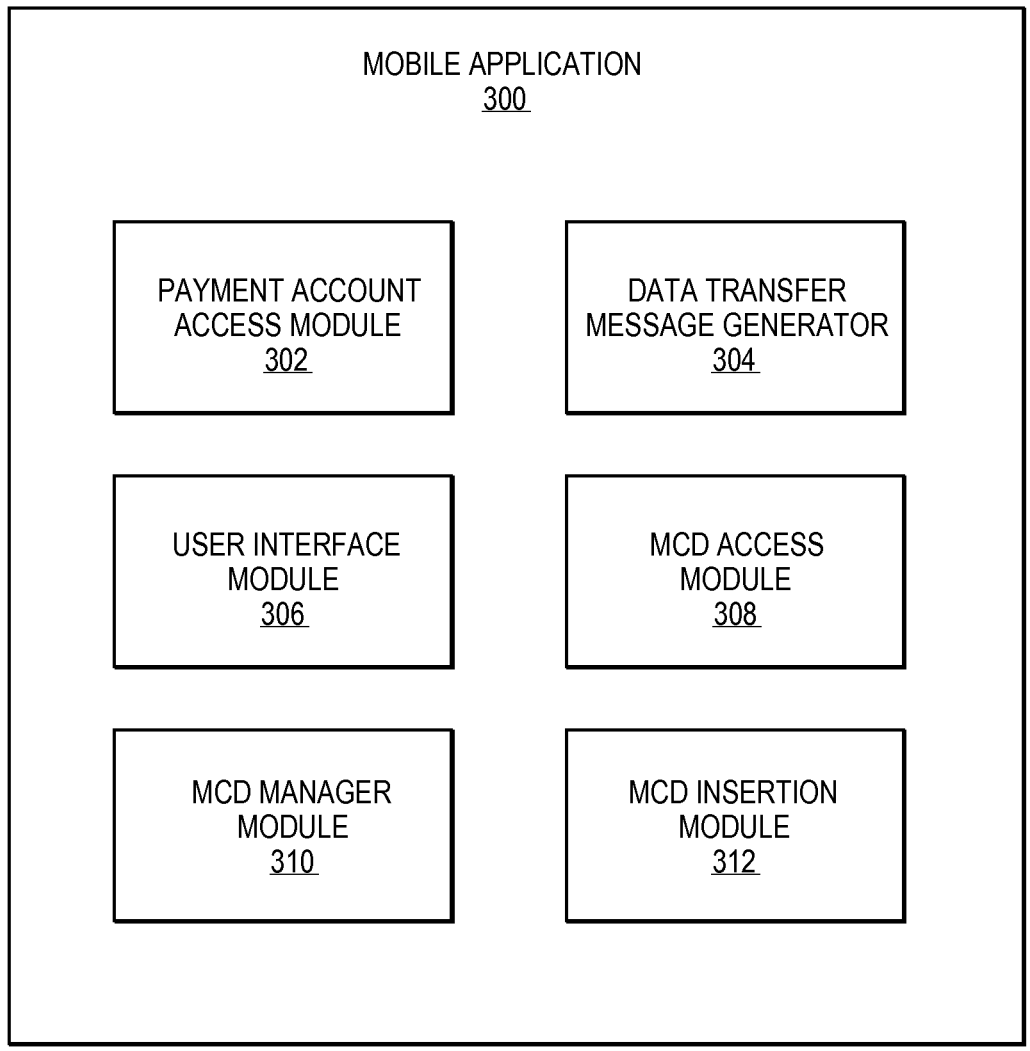
FIG. 3 illustrates some components of a mobile application, in one embodiment of the invention.

FIG. 3 illustrates some components of a mobile application 300, in one embodiment of the invention. The mobile application 300 may be embodied as computer code on the computer readable medium 204 in FIG. 2.

In some embodiments, the mobile application 300 may include a payment account access module 302, a data transfer message generator module 304, a user interface module 306, an MCD access module 308, an MCD manager module 310 and an MCD insertion module 312. The mobile application 300 may be part of the computer readable medium 204. It will be understood that the computer readable medium 204 may also include other modules that are not shown for the ease of simplicity, for example, the modules that may be needed for the mobile device 200 to function as a phone. In some embodiments, one or more components of the mobile application 300 may be stored and/or executed in the secure element 210.

The payment account access module 302 may be configured to access the payment account information associated with the consumer 102 when the consumer 102 initiates a payment transaction. For example, the payment account information may include a payment account number (PAN), an expiration date, a consumer name, a phone number, an address, a Card Verification value (CVV), a dynamic CVV (dCVV), a PIN verification code, or any other relevant information necessary for a payment transaction. In some embodiments, the payment account information may be stored in a secure memory such as the secure element 210 or the contactless element 206. If necessary, the mobile application 300 may have to authenticate itself to the secure element 210 before allowing the secure element 210 to allow the mobile application to obtain sensitive payment account information.

The data transfer message generator module 304 may be configured to generate a data transfer message when a payment transaction is initiated. For example, the consumer 102 may be at a merchant store and may have selected a product to purchase. The consumer may wish to pay using the mobile device 200 and may launch a wallet application to make the payment for the purchase. The data transfer message generator module 304 may generate a data transfer message that may include data related to the payment transaction. For example, the data transfer message may include payment account information accessed by the payment account access module 302. In some embodiments, the data transfer message may include a plurality of data fields that have been pre-designated to contain various data elements. The data elements may be numeric, alphabets or alpha numeric characters. In some embodiments, the pre-designated data fields may include data elements relating to the payment account information and any other information necessary for initiating the payment transaction. For example, the payment account information may include a cardholder name, an account identifier (e.g., an account number), an expiration date and a cryptogram. In accordance with embodiments of the invention, the one or more pre-designated data fields may be repurposed to contain data other than the data designated to be used for these data fields. In some embodiments, the data transfer message generator module 304 may also include issuer application data in a data field of the data transfer message. For example, the issuer application data may be used by the issuer computer 122 for authorization of the transaction. In some embodiments, a pre-designated data field in the data transfer message may be populated with a preset value that may normally be used to contain other data. For example, the data transfer message generator module 304 may prepopulate one of the pre-designated data fields with the mobile device number (e.g., phone number) or the email address of the consumer 102 that may be used as the merchant consumable data.

The length of each pre-designated data field or data element may be same or variable. In some embodiments, one or more of the data fields may be fixed in length. For example, a data field that includes the payment account number may be 19 digits long and may include numeric characters. In some embodiments, the payment account number may only be 16 digits long and the remaining 3 digits may be unused or assigned a pre-determined value such as zeros.

A portion of a data transfer message 400 is illustrated in FIG. 4A and includes exemplary pre-designated data fields. As illustrated in FIG. 4A, the data transfer message 400 may include data elements including an account identifier 402, an expiration date 404, a cryptogram 406, a card holder name 408, and issuer application data fields 412. In some embodiments, the account identifier 402 may be 16 digits long and may represent a payment account number (PAN) or a token associated with a payment account number. The expiration date 404 may be 4 digits long and may represent a month and a year (e.g., last 2 digits). The cryptogram 406 may be generated by the mobile application 300 and may be used by the payment processing network 110/issuer computer 112 to authenticate the transaction. The card holder name 408 may be pre-designated to store the name of the consumer 102. The issuer application data fields 412 may be pre-designated to store data that may be used by the issuer for authorization of the transaction. For example, the issuer application data fields 412 may include one or more data elements related to discretionary data for the issuer and the payment processing network, a key index, an available spending amount, a cryptogram version number, card verification results, etc. In some embodiments, the data transfer message 400 may include a transaction amount.

Referring back to FIG. 3, the user interface module 308 may be configured to provide a user interface for the consumer 102. The user interface may be a graphical user interface or an audio interface. In some embodiments, the user interface module 308 may enable the consumer 102 to utilize a keypad, a touch screen interface, a mouse or any other suitable method to enter data into the mobile device 200. In some embodiments, the user interface module 306 may allow the consumer 102 to enter a coupon code or a loyalty account number for a transaction. In some embodiments, the user interface module 306 may display a menu for the consumer 102 to select a coupon or a loyalty account for a transaction. In some embodiments, the user interface module 306 may allow the consumer 102 to register with the coupon/loyalty system 116, for example, by communicating with the merchant system using the user interface. In some embodiments, the user interface module 306 may allow the consumer 102 to select a payment account to make a payment, e.g., by displaying a menu.

The MCD access module 308 may be configured to enable the mobile device 200 to access the merchant consumable data that can be passed in a data transfer message to the access device 106. In some embodiments, the MCD access module 304 may include a scanning application that can enable the mobile device 200 to scan a machine readable code using the camera unit 216. The MCD access module 304 may include an NFC application that can enable the mobile device 200 to capture an NFC tag using the contactless element 206. The MCD access module 308 may be configured to retrieve merchant consumable data from a website, e.g., from a merchant website. In some embodiments, the MCD access module 304 may also store the merchant consumable data read by using any of the above methods to be used later on for a payment transaction. For example, the merchant consumable data may be stored in the memory 208.

The MCD manager module 310 may be configured to manage the merchant consumable data accessed by the MCD access module 308. For example, in some embodiments, a machine readable code or data from an NFC tag captured by the mobile device 200 may include a location or other merchant specific information (e.g., merchant identifier). The MCD manager module 310 may determine a merchant location from the merchant consumable data and send a request to the payment processing network 110 (or other computer) to provide the merchant consumable data based on the merchant location. For example, if the merchant location indicates San Francisco, then the payment processing network 110 may provide a customized coupon for the San Francisco location. In another example, the MCD manager module 310 may determine a business category (e.g., books) from the merchant identifier and send a request to the payment processing network 110 to provide the merchant consumable data based on the business category. In some embodiments, the MCD manager module 310 may be configured to download updated loyalty account information from the payment processing network 110 when the consumer 102 selects a loyalty account using a menu provided by the user interface module 306.

The MCD insertion module 314 may be configured to insert merchant consumable data in one of the pre-designated data fields of a data transfer message. Referring to FIG. 4A, the MCD insertion module 314 may insert merchant consumable data into one of the data fields of the data transfer message 400. The merchant consumable data may be provided by the consumer 102 using the user interface module 306 or accessed using the MCD access module 308 or stored in the memory 208. The merchant consumable data may be a coupon code, a loyalty account number or any merchant defined data. The length of the merchant consumable data may be fixed or variable. In some embodiments, the MCD insertion module 314 may determine if the merchant consumable data meets a size requirement or any other relevant criteria before inserting the merchant consumable data in one of the pre-designated data fields of the data transfer message.

The MCD insertion module 314 may be configured to insert merchant consumable data into one of the plurality of designated data fields designed to contain data other than the merchant consumable data, for example, any of the data fields of the data transfer message 400. In one embodiment, as shown in FIG. 4B, merchant consumable data may be inserted in the data field 408 designated for the card holder name. If the card holder name data field has a fixed length, for example, 20 characters, any unused characters may be assigned a predetermined value such as zeros or left unused. For example, if the merchant consumable data includes a coupon code "REDEEM20" that is 8 characters long, the remaining 12 characters may be assigned to zeros. If the merchant consumable data has a variable length, the merchant consumable data may be represented using a data tag. For example, the coupon code "REDEEM20" may be represented as the data tag "108REDEEM20", wherein "1" may indicate that the data element is a coupon code, and "08" may indicate that the value "REDEEM20" is 8 characters long.

Figure 5A:
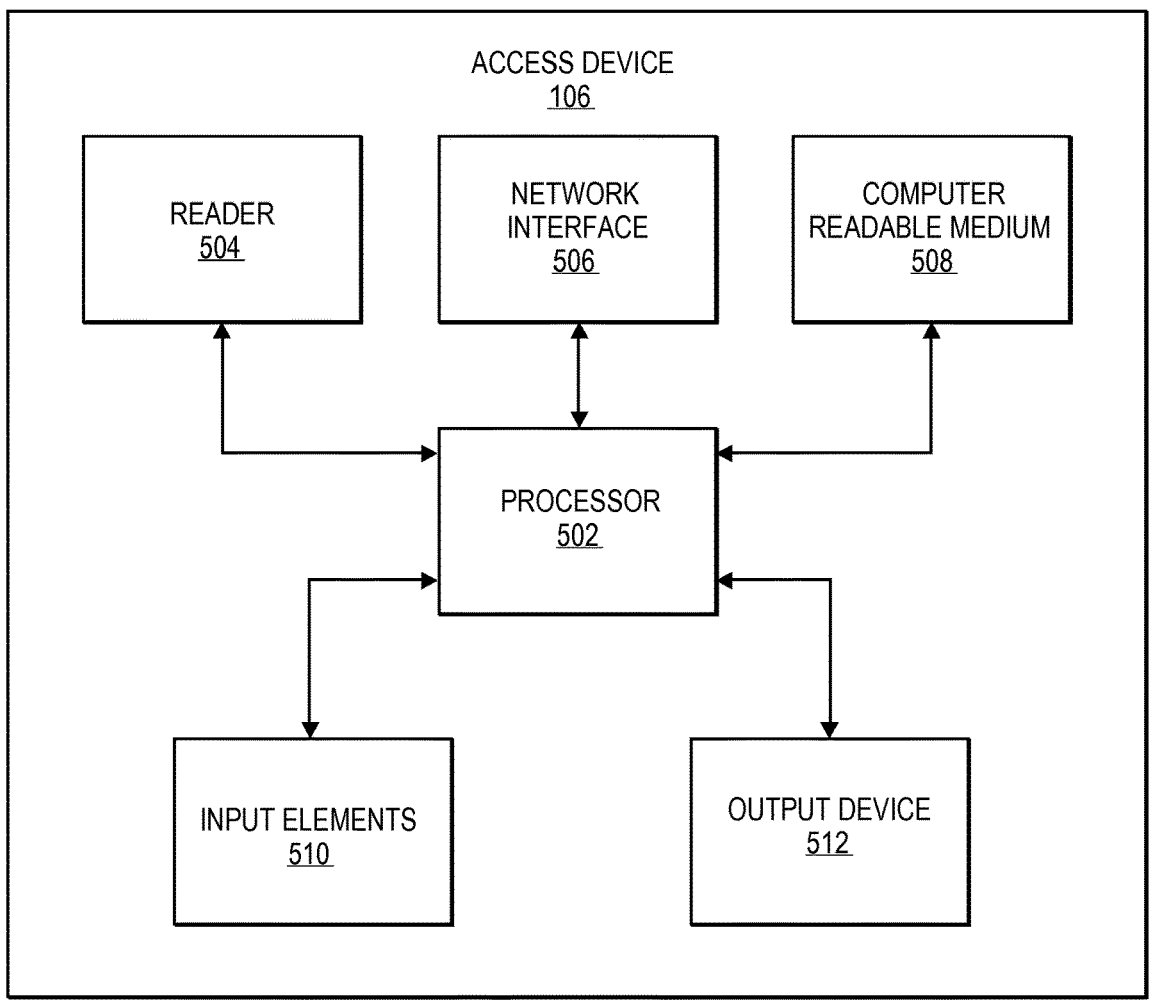
FIGS. 5A-5B illustrate an access device and the computer readable medium for the access device, in one embodiment of the invention.

FIG. 5A illustrates the access device 106 in one embodiment of the invention.

The access device 106 may include a processor 502 operatively coupled to a reader 504, a network interface 506, a computer readable medium 508, an input elements 510 and an output device 512. The computer readable medium 508 may comprise instructions or code, executable by the processor 502. The instructions may include instructions for reading the data transfer message transmitted by the mobile payment device 104, extracting the merchant consumable data from the data transfer message and processing the merchant consumable data.

The reader 504 may be a contactless reader or a magnetic stripe reader. In some embodiments, the contactless reader may be configured to read a smart payment card (e.g., debit or credit card), a magnetic strip card, a mobile device such as a mobile phone, a PDA, a tablet, etc. The input elements 510 may include a keypad, buttons or a touch screen, etc. The output device 512 may be a display, a monitor, a speaker, etc. The network interface 506 may allow the access device 106 to communicate with the mobile payment device 104 using radio waves. The network interface 506 may also allow the access device 106 to communicate with the coupon/loyalty system 116 using a communications network (not shown), e.g., the Internet.

Figure 5B:
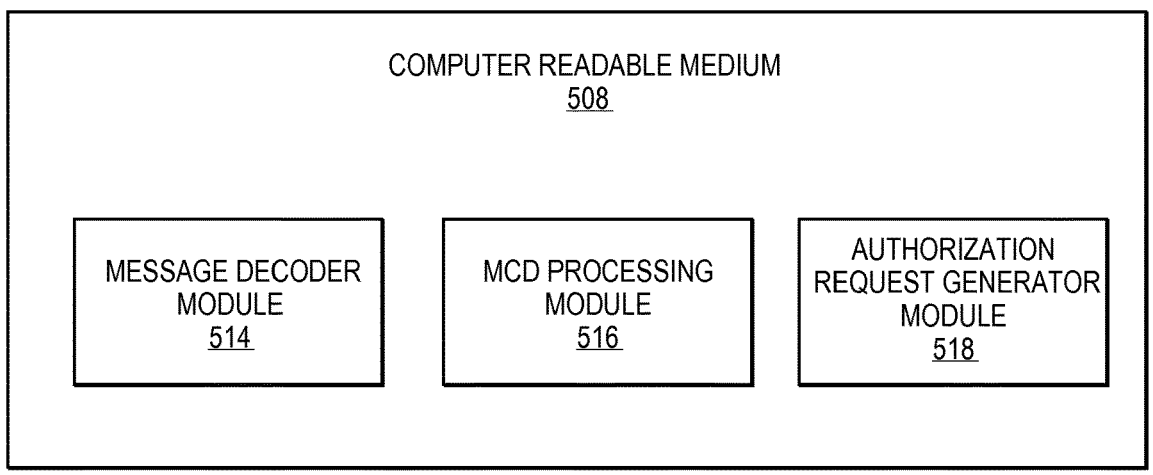

FIG. 5B illustrates the computer readable medium 508, in one embodiment of the invention. The computer readable medium 508 may include a message decoder module 514, an MCD processing module and an authorization request generator module 518.

The message decoder module 514 may be configured to receive the data transfer message and decode the data transfer message, for example, when the consumer 102 starts the payment process by waving the mobile payment device 102 in the close proximity to the reader 504 or tapping the mobile payment device 102 at the reader 504. As discussed with reference to FIG. 4B, the data transfer message may include the payment account information and the merchant consumable data. In some embodiments, the message decoder module 514 may extract one or more data elements of the data transfer message. For example, the message decoder module 514 may extract the merchant consumable data from the data transfer message. The message decoder module 514 may also extract the payment identifier and the expiration date from the message decoder module 514. In some embodiments, the message decoder module 514 may not decode the issuer application data fields and forward data in those data fields to the issuer computer 112 in an authorization request message.

The MCD processing module 516 may be configured to process the merchant consumable data. In some embodiments, the MCD processing module 516 may generate a MCD message comprising the MCD and provide the MCD message to the coupon/loyalty system 116. In some embodiments, the MCD message may also include information related to the transaction, for example, the transaction amount, date and time of the transaction, a merchant identifier and any other relevant information that may be needed by the coupon/loyalty system 116 to determine the validity of the MCD. The MCD processing module 516 may receive a response from the coupon/loyalty system 116 indicating if the MCD is valid and can be applied to the transaction. In some embodiments, if the MCD is valid and the MCD includes a coupon, the MCD processing module 516 may determine an authorization amount for the transaction after applying the coupon value. For example, if the transaction amount was $10 and the coupon includes a 10% discount, the authorization amount calculated by the MCD processing module 516 will be $9. In some embodiments, if the MCD is valid and the MCD includes a loyalty account number, the MCD processing module 516 may determine points or rewards associated with the loyalty account number. For example, depending on the number of points, the authorization amount may be reduced by the amount corresponding to the total points or the consumer may decide to redeem the points using available options, for example, get a free coffee or get discount on future purchases, etc. Note that other options of using the merchant consumable data are possible. For example, in some embodiments, the merchant consumable data may include merchant defined data that may be consumed by the merchant for merchant specific applications, when passed from the mobile payment device 104 to the access device 106.

The authorization request generator module 518 may be configured to generate an authorization request message including the authorization amount determined by the MCD processing module 516. The authorization request message may be forwarded to the acquirer computer 108 that may forward it to the issuer computer 112 via the payment processing network 110.

Figure 6:
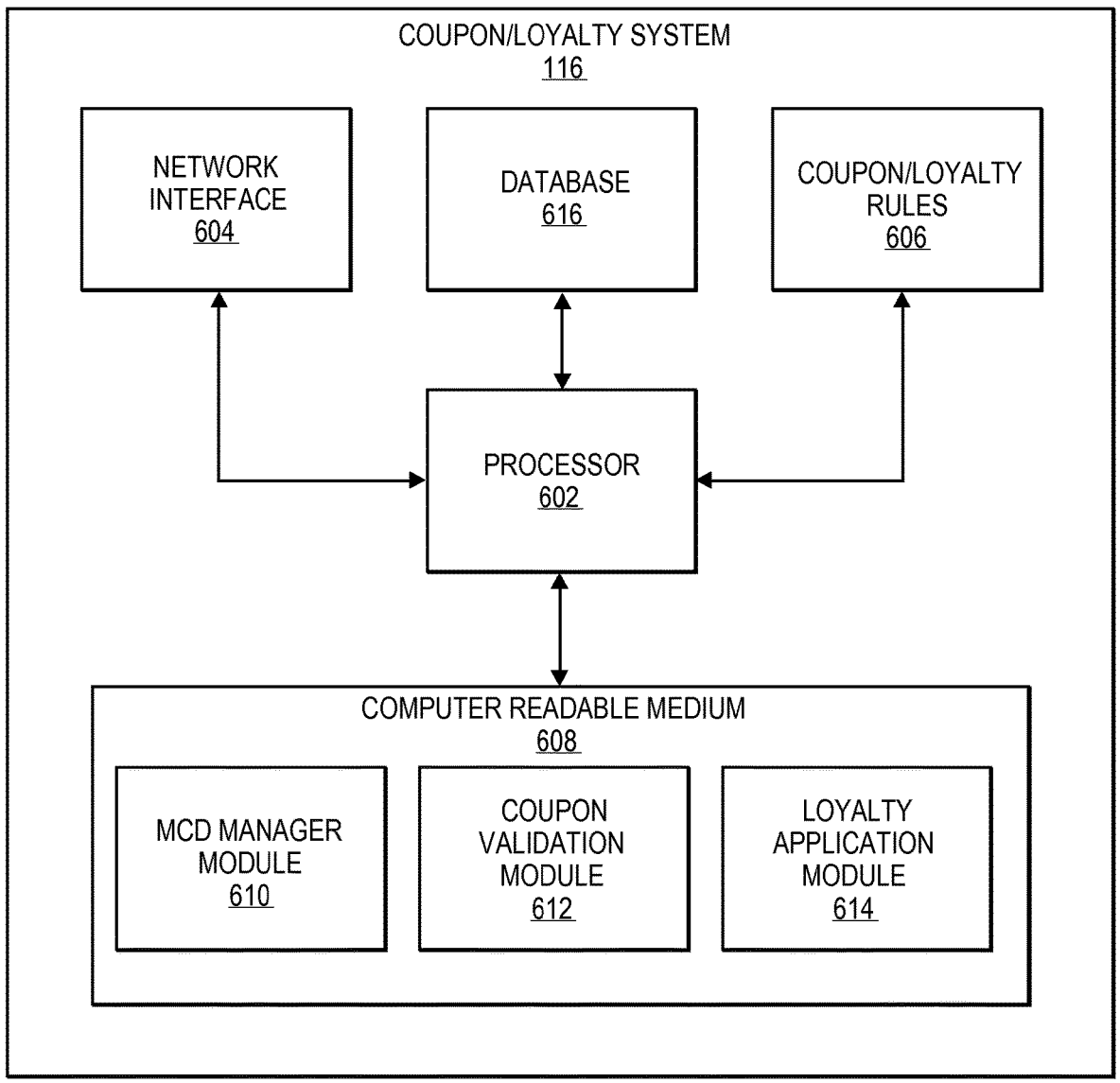
FIG. 6 illustrates some components of a coupon/loyalty system in one embodiment of the invention.

FIG. 6 illustrates some components of the coupon/loyalty system 116 in one embodiment of the invention.

The coupon/loyalty system 116 may include a processor 602 operatively coupled to a network interface 604, coupon/loyalty rules 606, a computer readable medium 608 and a database 616. The computer readable medium 608 may comprise instructions or code, executable by the processor 602. The computer readable medium 608 may comprise an MCD manager module 610, a coupon validation module 612 and a loyalty application module 614. In some embodiments, the coupon/loyalty system 116 may be associated with a merchant.

The network interface 604 may be configured to communicate with the access device 106, the message gateway 114 and other entities (not shown) using one or more communications networks.

The database 616 may be configured to include coupons or loyalty account information associated with the merchant and/or consumers.

The coupon/loyalty rules 606 may be stored in a memory or on the computer readable medium 608. In some embodiments, the coupon/loyalty rules may be associated with various loyalty accounts stored in the database 616. In some embodiments, the coupon/loyalty rules may be managed by a merchant, a payment processing network or an issuer.

The MCD manager module 610 may be configured to manage the merchant consumable data. The MCD manager module 610 may receive an MCD message containing the merchant consumable data from the access device 106. In some embodiments, the MCD manager module 610 may receive a loyalty message containing the loyalty account information from the access device 106. In some embodiments, the MCD manager module 610 may determine the merchant consumable data that may be made available to the mobile devices. In some embodiments, the MCD manager module 610 may communicate with the payment processing network 110 to provision the merchant consumable data to the mobile device 200 via the mobile application 300. In some embodiments, the MCD manager module 610 may enable registration of the consumer 102 with the coupon/loyalty system 116. For example, the MCD manager module 610 may store information associated with the consumer 102 (e.g., mobile device number, email address of the consumer, consumer name, address, etc.) in a database. In some embodiments, the MCD manager module 610 may generate a response message based on the validity of the merchant consumable data as determined by the coupon validation module 612 and/or the loyalty application module 614.

The coupon validation module 612 may be configured to validate a coupon based on the rules for coupons stored in the coupon/loyalty rules 606. For example, some of the rules to validate coupons may include whether the coupon is not expired, the purchase is qualified for the coupon to apply (e.g., has met a minimum purchase requirement) or the coupon is being used by the consumer to which the coupon is issued, etc. In some embodiments, the coupon validation module 612 may be configured to determine if the coupon may be applied to the current transaction.

The loyalty application module 614 may be configured to determine if the loyalty account is valid based on the rules associated with the loyalty account. In some embodiments, the loyalty application module 614 may determine if the consumer 102 may earn loyalty points for the current transaction based on the rules. In some embodiments, the loyalty application module 614 may determine if the consumer 102 may redeem loyalty points or rewards based on the rules.

Figure 7A:
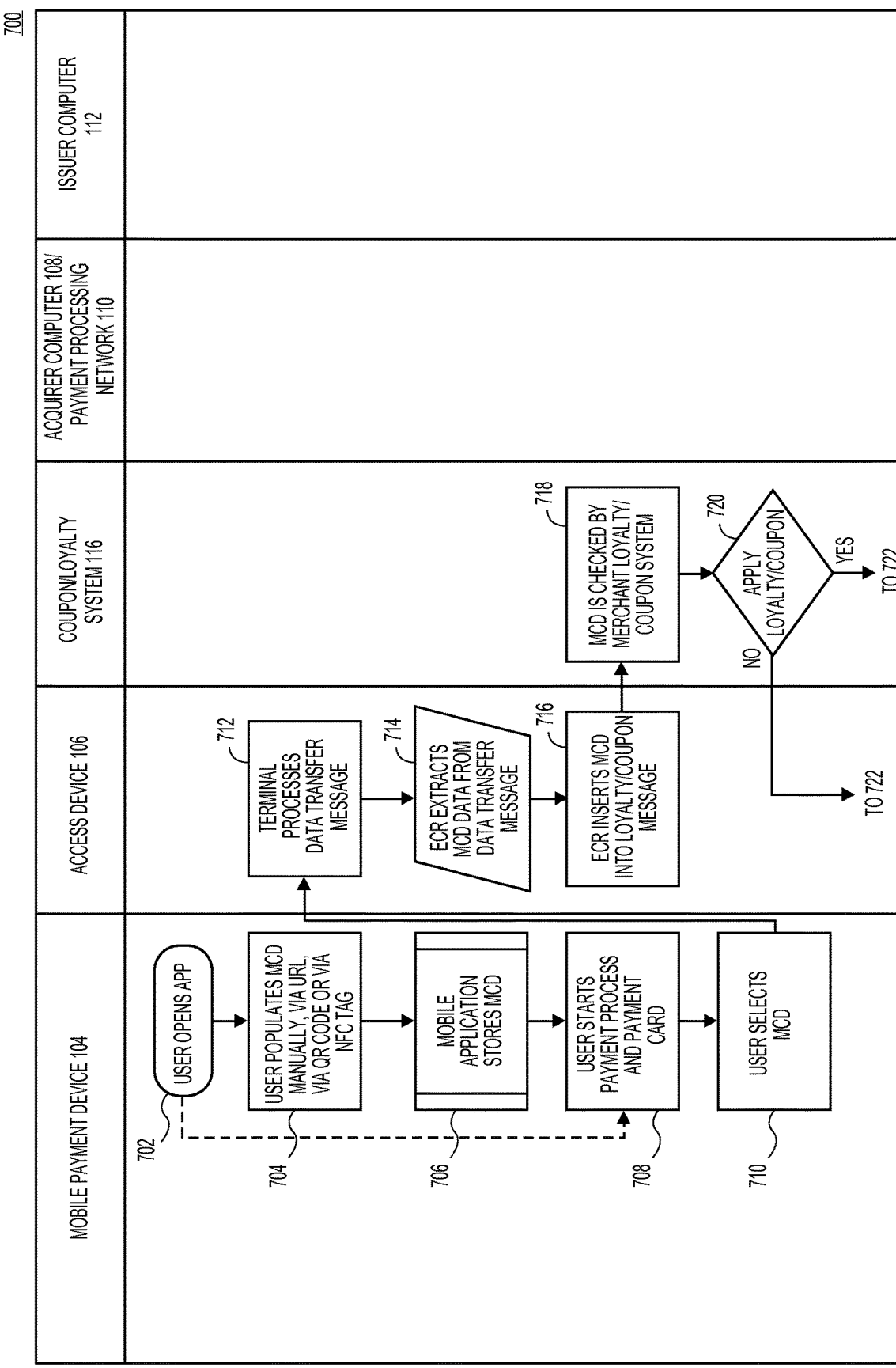
FIGS. 7A-7B illustrate a general use case for merchant consumable data in one embodiment of the invention.
Figure 7B:
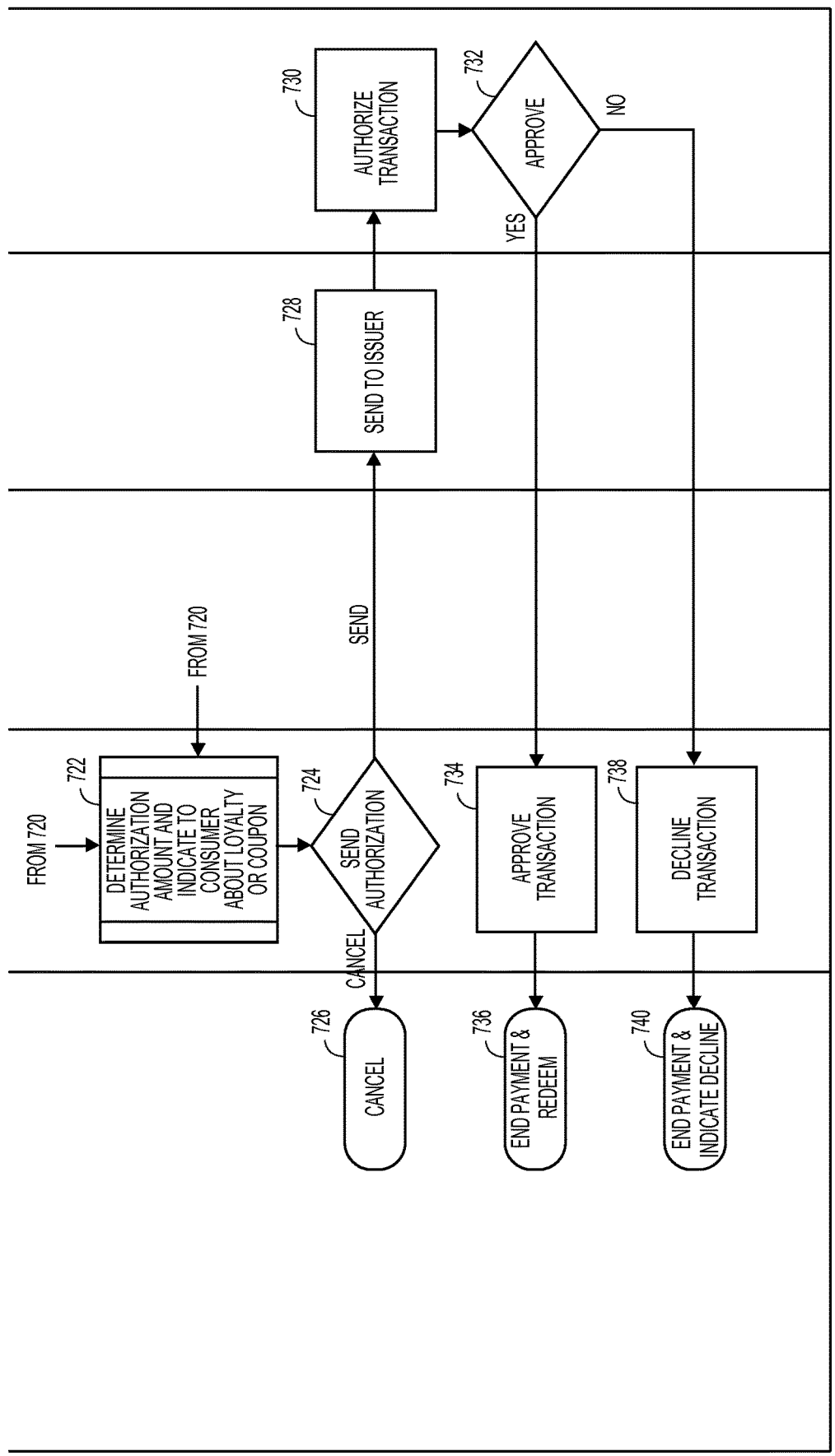

FIGS. 7A-7B illustrate a general use case for merchant consumable data in one embodiment of the invention.

In step 702, the consumer 102 may open a mobile application to pay for a transaction. For example, the consumer 102 may be at a merchant location and may want to purchase a product using the mobile device 200. The merchant may enter the product information into the electronic cash register 106B and may prompt the consumer 102 to pay. The consumer 102 may launch the mobile application 300 to pay for the purchase. The user interface module 306 may present a graphical user interface on the display of the mobile device 200. A data transfer message may be generated by the data transfer generator module 304 using the payment account information accessed by the payment account access module 302 and some other relevant information needed for the payment transaction. In some embodiments, a pre-designated data field in the data transfer message may be populated with a preset value. For example, referring back to FIG. 4B, the mobile device number or the email address of the consumer 102 may be stored as the merchant consumable data in the data field 408. The consumer 102 may start the payment process as shown in step 708. Alternatively, the MCD may be accessed using one of the methods discussed previously and stored by the mobile device 200 as discussed with reference to steps 704 and 706.

In step 704, the consumer 102 may populate the MCD manually, by scanning a machine readable code, by reading an NFC tag or downloading it from a website.

In step 706, the mobile payment device 104 may store the MCD. For example, the user interface application 306 may store the MCD into memory 208.

In step 708, the consumer 102 may start the payment process. For example, the consumer may select a payment account using the mobile application 300. In some embodiments, the consumer 102 may select a payment account using a wallet application. The mobile application 300 may generate a data transfer message with the payment account information. The data transfer message may include a plurality of data fields.

In step 710, the consumer 102 may select the merchant consumable data to apply for the current transaction. For example, the consumer 102 may select the merchant consumable data using the user interface provided by the user interface module 306 on the display of the mobile device 200. The MCD insertion module 312 may insert the merchant consumable data into one of the pre designated data field of the data transfer message. The consumer 102 may wave the mobile device 200 or tap the mobile device 200 in proximity of the access device 106 to transfer the data transfer message to the payment terminal 106A of the access device 106 using a short range communication technology such as NFC.

In a typical transaction flow, there may be exchange of data and control signals between the mobile device 200 and the access device 106 before and after the data transfer message is sent from the mobile device 200 to the access device 106. For example, when the consumer 102 is ready to pay for a product, the merchant may scan a code on the product, or manually enter the code or the amount in to the access device 106. The access device 106 may receive the transaction amount and power up the reader 504. The access device 106 can activate the mobile device 200 with a first signal. Next, the access device 106 can perform an application selection process to determine the contactless application on the mobile device 200 to conduct the transaction with. For example, the access device 106 may read a list of contactless applications supported by the mobile device 200 and may select an appropriate contactless application using a third signal. The mobile device 200 then can respond with a list of data needed from the access device 106. The access device 106 then can provide with its capabilities to the mobile device 200 and transaction information (e.g., transaction amount). For example, the capabilities may include the type of consumer device the access device 106 can interact with such as a smart card, a magnetic stripe card, a smart phone, etc. In some cases, the access device 106 can also provide data to the mobile device 200 that can be used in the generation of cryptograms, e.g., cryptogram 406. The mobile device 200 can then send the data transfer message to the access device 106. In some cases, cardholder verification may be required to process the transaction. For example, the consumer 102 may be prompted to enter a PIN, a password or a signature in some instances.

In step 712, the access device 106 may process the data transfer message. For example, the reader 504 of the access device 106 may capture the data transfer message via radio waves. The message decoder module 514 may decode the data transfer message.

In step 714, the message decoder module 514 may extract the merchant consumable data from the data transfer message. In some embodiments, the message decoder module 514 may also extract the payment account identifier and the expiration date from the data transfer message.

In step 716, the electronic cash register 106B may insert the merchant consumable data into an MCD message. For example, the MCD processing module 516 may generate an MCD message with the merchant consumable data and some other information associated with the transaction such as the transaction amount, data and time of the transaction, etc. The electronic cash register 106B may transmit the MCD message to the coupon/loyalty system 116.

In step 718, the coupon/loyalty system 114 may determine the validity of the merchant consumable data. Referring back to FIG. 6, the MCD manager module 610 may receive the MCD message containing the merchant consumable data from the access device 106 and the coupon validation module 612 may determine if the merchant consumable data is valid based on the rules stored in the coupon/loyalty rules 606.

In step 720, the coupon/loyalty system 114 may determine if the merchant consumable data may be applied to the current transaction. Referring back to FIG. 6, the coupon validation module 612 may determine if the determine if the merchant consumable data may be applied to the current transaction. The MCD manager module 610 may generate a response message based on the validity of the merchant consumable data as determined by the coupon validation module 612 and/or the loyalty application module 614.

In step 722, the access device 106 may determine the authorization amount based on the response message from the coupon/loyalty system 116. For example, the MCD processing module 516 may determine the authorization amount by applying the coupon or discount value to the transaction amount. The MCD processing module 516 may also determine the points or rewards for the loyalty account provided in the MCD. The access device 106 may send a message to the mobile device 200 indicating whether the loyalty/coupon has been applied to the transaction.

In step 724, the access device 106 may determine if the transaction is cancelled by the mobile device 200 or if the authorization request message may be generated. If the transaction is not canceled, the authorization request message is sent to the payment processing network 110 via the acquirer computer 108. The authorization request message may include issuer application data fields passed from the mobile device 200 in the data transfer message. In some embodiments, the authorization request message does not include the merchant consumable data.

In step 726, the transaction is cancelled by the mobile device 200. For example, the consumer 102 may decide to cancel the transaction if the coupon cannot be applied to the transaction or due to some other reason.

In step 728, the payment processing network 110 may send the authorization request message to the issuer computer 112.

In step 730, the issuer computer 112 may determine if the transaction may be authorized based on the authorization request message and any other information associated with the payment account of the consumer 102 with the issuer.

In step 732, the issuer computer 112 may determine if the transaction may be approved or not. In some embodiments, the issuer computer 112 may generate and send an authorization response message to the access device 106 with the result of the authorization.

In step 734, the access device 106 may receive the authorization response indicating that the transaction is approved by the issuer computer 112. The access device 106 may transmit a message to the mobile device 200 indicating that the transaction was approved.

In step 736, the mobile device 102 may complete the transaction. In some embodiments, the consumer 102 may redeem the points/rewards associated with the loyalty account.

In step 738, the access device 106 may receive the authorization response indicating that the transaction is declined by the issuer computer 112. The access device 106 may transmit a message to the mobile device 200 indicating that the transaction was declined.

In step 740, the mobile device 102 may end the transaction. The mobile device 200 may indicate that the transaction was declined. For example, the user interface 306 may display a message on the mobile device 200. In some embodiments, the consumer 102 may be informed with a text message or email that the transaction was declined.

Figure 8A:
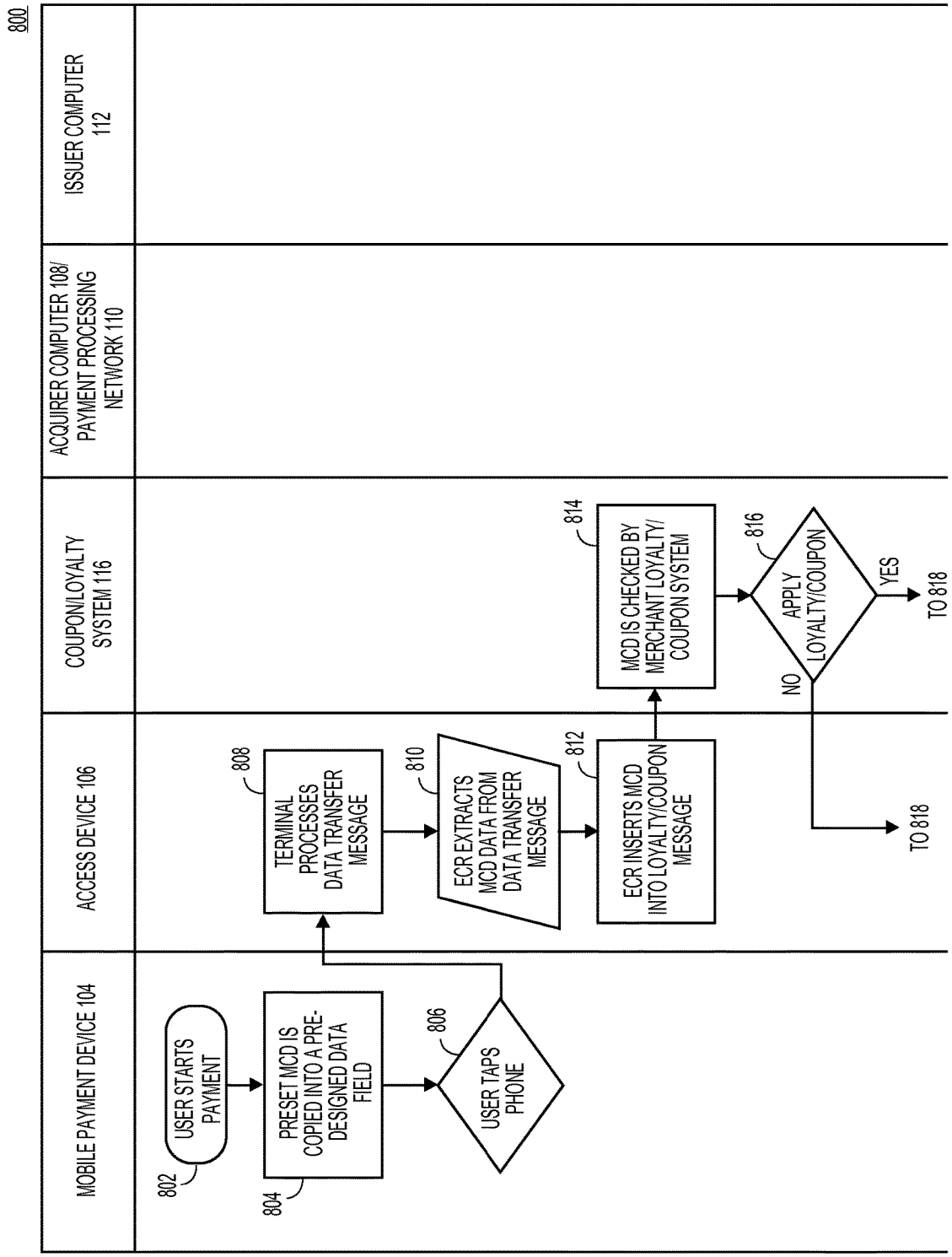
FIGS. 8A-8B illustrate a use case for a payment transaction with the merchant consumable data using a preset value, in one embodiment of the invention.
Figure 8B:
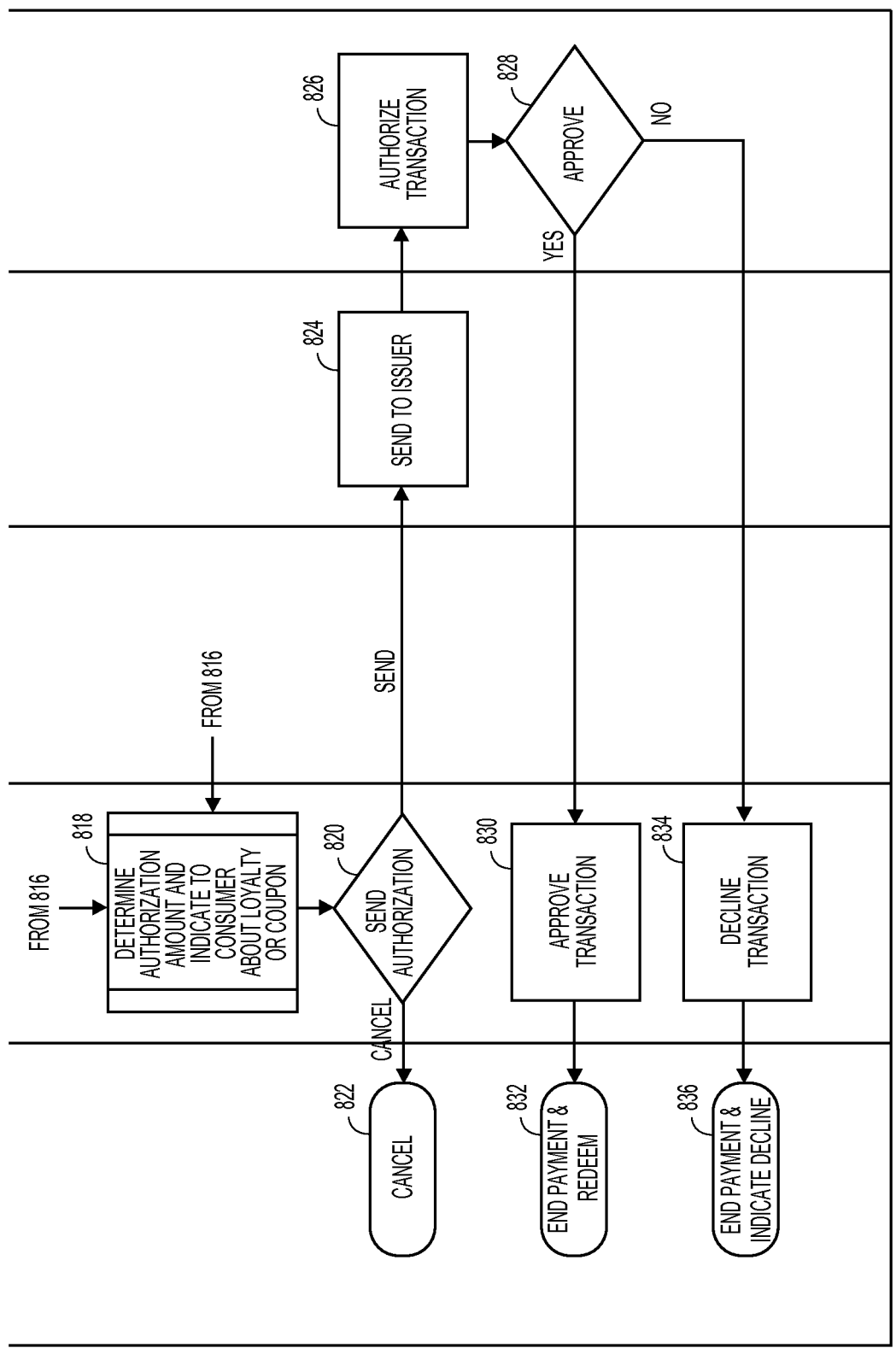

FIGS. 8A-8B illustrate a use case for a payment transaction with the merchant consumable data using a preset value, in one embodiment of the invention.

In step 802, the consumer 102 may start a payment transaction. For example, the consumer 102 may be at a merchant location and may want to purchase a product using the mobile device 200. The merchant may enter the product information into the electronic cash register 106B and may prompt the consumer 102 to pay. In some embodiments, the consumer 102 may launch the mobile application 300 and may select a payment account. In some embodiments, the consumer 102 may select a payment account using a wallet application. FIG. 15A illustrates a user interface provided by the mobile application 300 in one embodiment of the invention. As shown in the graphical user interface, the mobile application 300 may provide an option to the consumer 102 to select a payment account (1514). The mobile application 300 may generate a data transfer message with the payment account information.

In step 804, the preset merchant consumable data may be copied into a pre designated data field of the data transfer message. In some embodiments, the preset merchant consumable data may be a mobile device phone number or an email address of the consumer 102. For example, the user interface module 306 may insert the merchant consumable data into one of the pre designated data field of the data transfer message generated by the data transfer message generator module 304.

In step 806, the consumer 102 may tap the mobile device 200 or wave the mobile device 200 in proximity of the access device 106 to make the payment. This may allow transfer of the data transfer message to the payment terminal 106A of the access device 106 using the radio waves.

Steps 808, 810, 812, 814, 816, 818, 820, 822, 824, 826, 828, 830, 832, 834 and 836 of FIGS. 8A-8B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 9A:
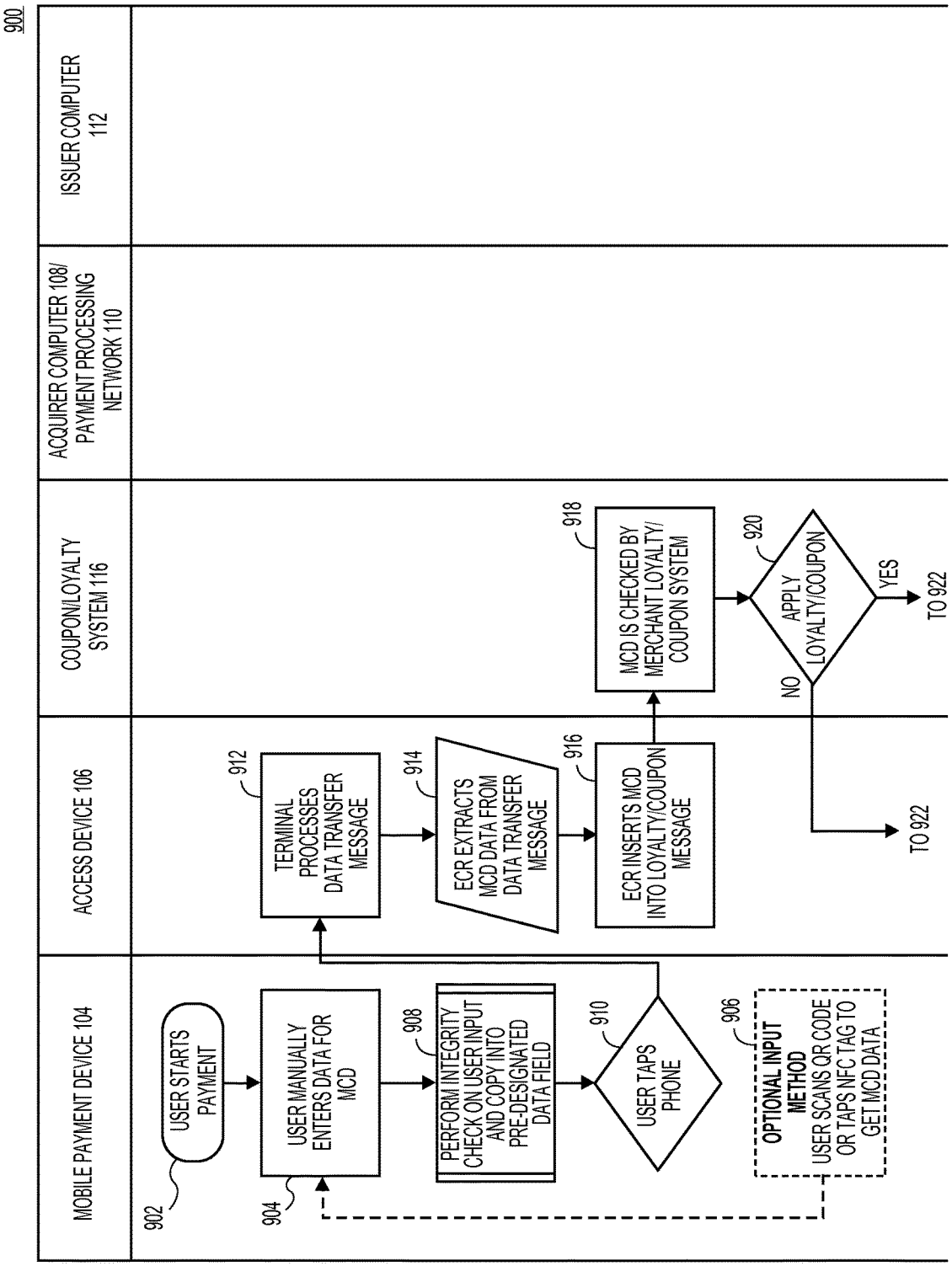
FIGS. 9A-9B illustrate a use case for a payment transaction with the manual entry of the merchant consumable data, in one embodiment of the invention.
Figure 9B:
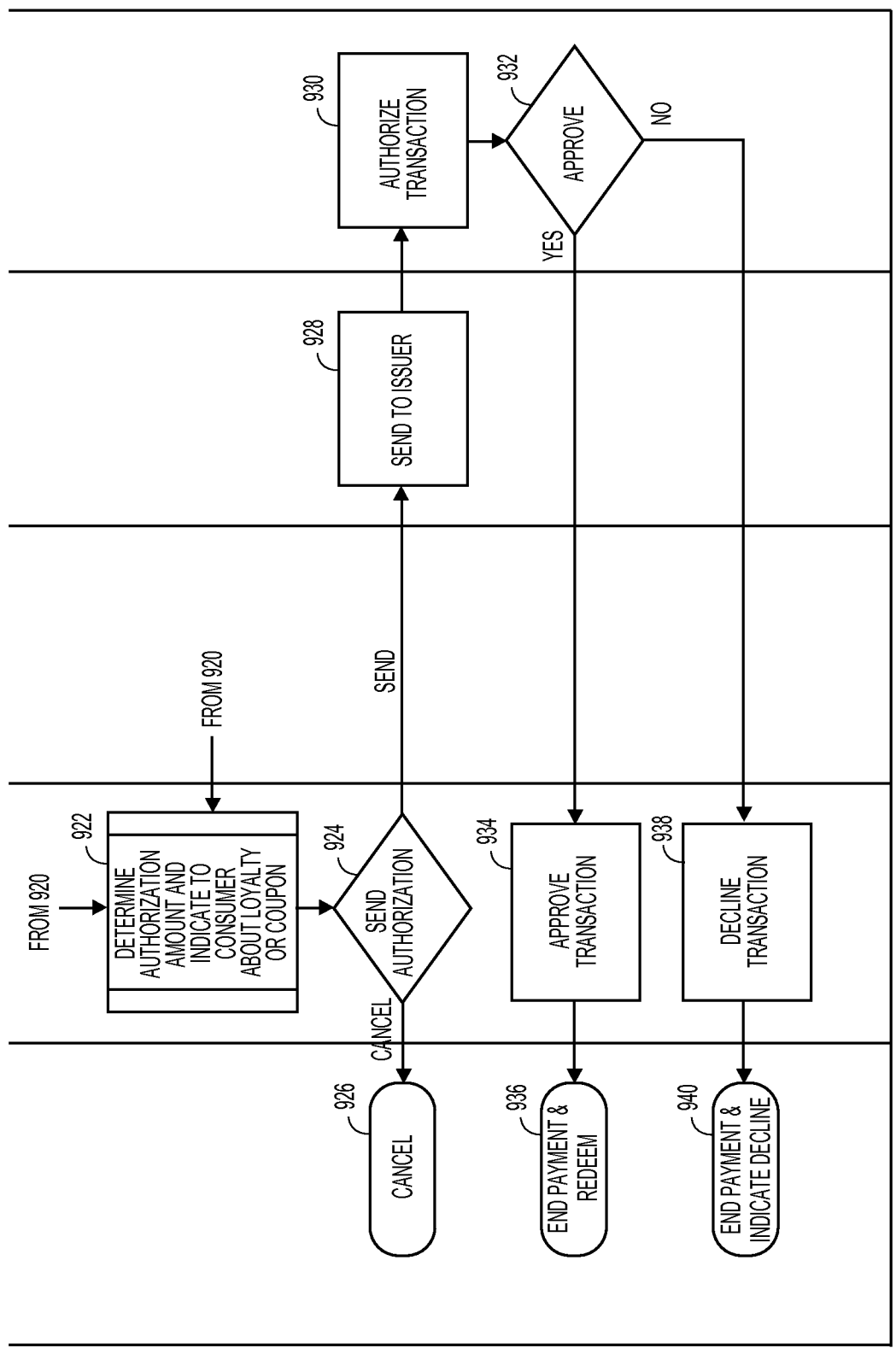

FIGS. 9A-9B illustrate a use case for a payment transaction with the manual entry of the merchant consumable data, in one embodiment of the invention.

In step 902, the consumer 102 may start a payment transaction. For example, the consumer 102 may be at a merchant location and may want to purchase a product using the mobile device 200. The merchant may enter the product information into the electronic cash register 106B and may prompt the consumer 102 to pay. In some embodiments, the consumer 102 may launch the mobile application 300 and may select a payment account. In some embodiments, the consumer 102 may select a payment account using a wallet application. The mobile application 300 may generate a data transfer message with the payment account information.

In step 904, the consumer 102 may enter the merchant consumable data manually via the user interface. In some embodiments, the user interface module 306 may provide a graphical user interface on the display screen of the mobile device 200 to prompt the consumer 102 to enter the merchant consumable data. For example, the consumer 102 may enter a coupon code (e.g., REDEEM20) using the touch screen or a keypad interface of the mobile device 200. As shown in FIG. 15A, the mobile application 300 may provide an option to the consumer 102 to enter the coupon code (1502) using the graphical user interface.

In step 906, instead of manually entering the, the consumer 102 may scan a machine readable code or tap an NFC tag to get the merchant consumable data. For example, the consumer 102 may use the camera unit 216 or the contactless element 206 on the mobile device 200 to capture the merchant consumable data.

In step 908, the merchant consumable data entered manually by the consumer 102 may be validated by the mobile application 300 to determine whether the value entered by the consumer 102 meets the size compliance. For example, if the maximum size limitation of the data field is 26 characters, the coupon code entered by the consumer 102 cannot exceed more than 26 characters. Once the size compliance or any other requirement has been met (e.g., no special characters, etc.), the mobile application 300 may insert the merchant consumable data into one of the pre-designated data fields of the data transfer message.

In step 910, the consumer 102 may tap the mobile device 200 or wave the mobile device 200 in proximity of the access device 106 to make the payment. This may allow transfer of the data transfer message to the payment terminal 106A of the access device 106 using the radio waves.

Steps 912, 914, 916, 918, 920, 922, 924, 926, 928, 930, 932, 934, 936, 938 and 940 of FIGS. 9A-9B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 10A:
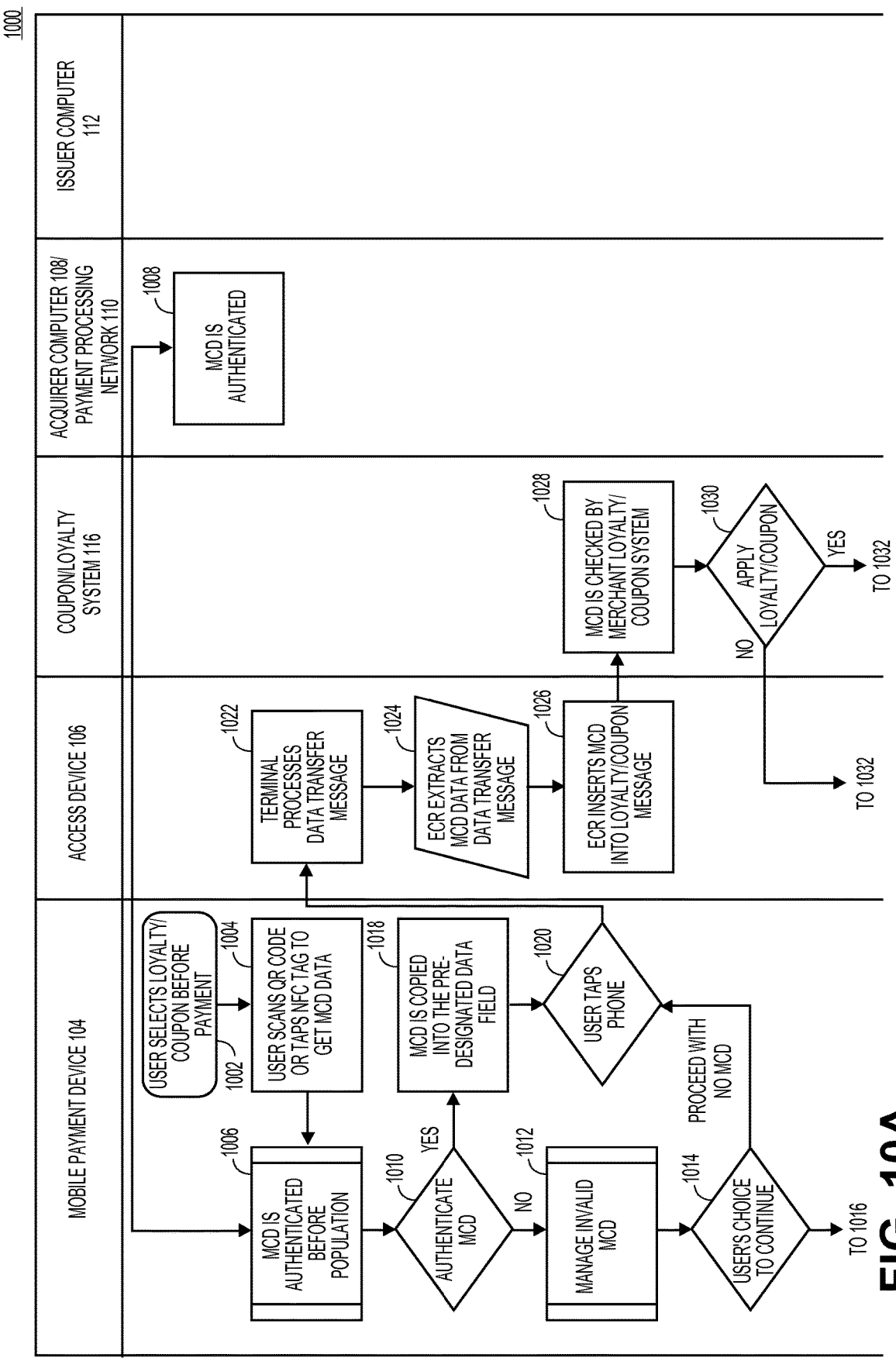
FIGS. 10A-10B illustrate a use case for a payment transaction with the authenticated merchant consumable data, in one embodiment of the invention.
Figure 10B:
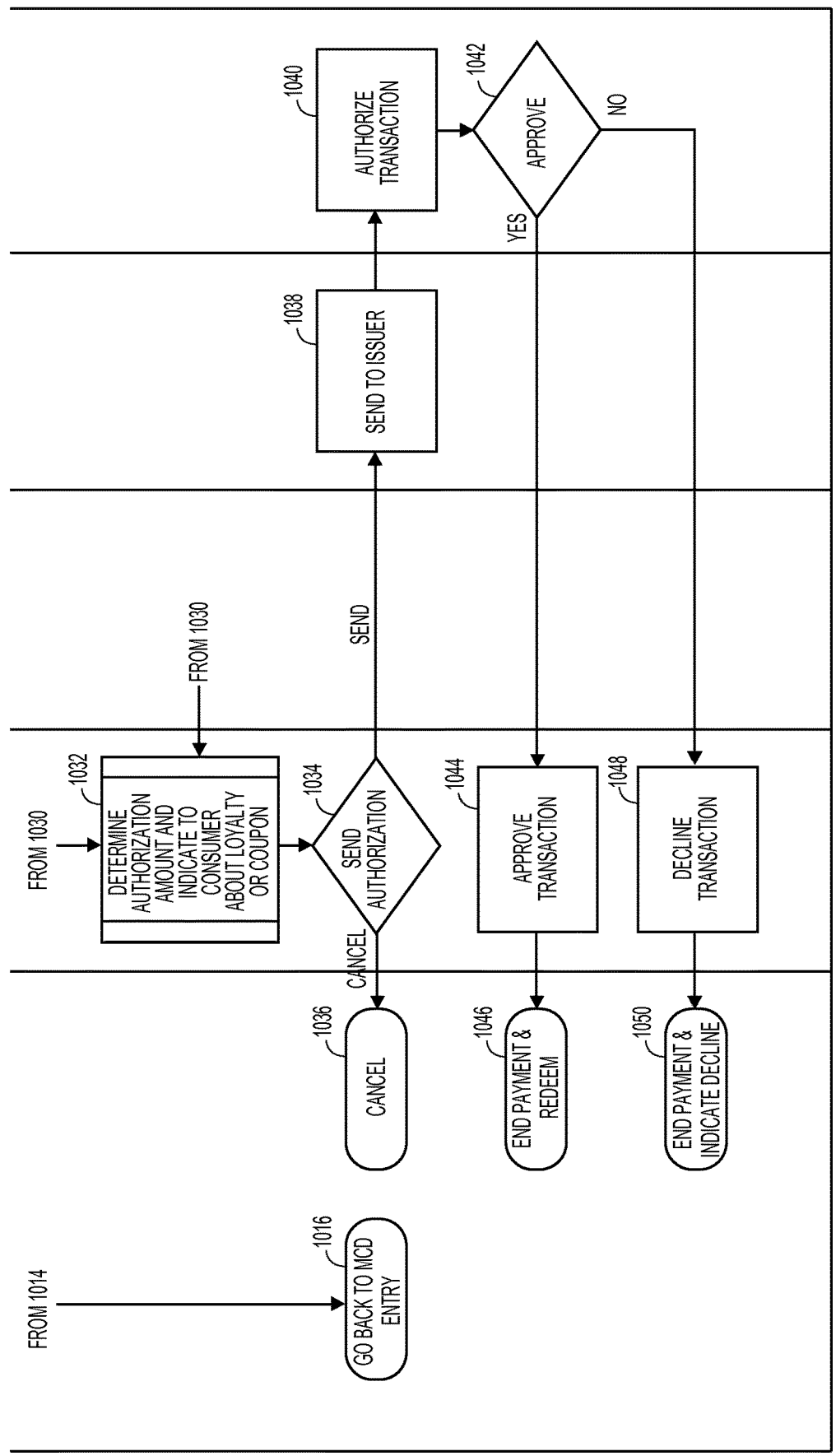

FIGS. 10A-10B illustrate a use case for a payment transaction with the authenticated merchant consumable data, in one embodiment of the invention.

In step 1002, the consumer 102 may select a coupon or a loyalty account before making a payment. For example, the consumer 102 may have previously registered with the coupon/loyalty system 116 and may have a loyalty account.

In step 1004, the consumer 102 may scan a machine readable code or tap an NFC tag to get the merchant consumable data. For example, the consumer may use the camera unit 216 or the contactless element 206 on the mobile device 200 to capture the merchant consumable data. As illustrated in FIG. 15A, the mobile application 300 may provide an option to the consumer 102 to scan a QR™ code (1506) or tap an NFC tag (1508) using the graphical user interface.

In step 1006, the merchant consumable data may be authenticated before inserting in the data transfer message. For example, the merchant consumable data may include a digital signature, a cryptogram or anther suitable means of authentication to prevent counterfeiting of the merchant consumable data. In some embodiments, the merchant consumable data may be authenticated by the payment processing network 110 or another entity. For example, referring back to FIG. 1, the mobile payment device 104 may communicate with the payment processing network 110 via the message gateway 114 and communications network 118 to authenticate the merchant consumable data. For example, the payment processing network 110 may verify the digital signature, cryptogram or other authentication data associated with the merchant consumable data to determine its validity.

In step 1008, the merchant consumable data may be authenticated by the payment processing network 110. For example, a server computer at the payment processing network 110 may determine if the merchant consumable data is authenticated based on a set of rules.

In step 1010, the mobile device 200 may determine if the merchant consumable data is authenticated or not based on a response from the payment processing network 110.

In step 1012, if the merchant consumable data is not authentic, the mobile device 200 may manage the invalid merchant consumable data. For example, the mobile application 300 may delete the merchant consumable data or mark the merchant consumable data as invalid.

In step 1014, if the merchant consumable data is not authentic, the mobile application 300 may display on the mobile device 200 that the merchant consumable data is not valid and prompt the consumer 104 if they wish to continue.

In step 1016, if the consumer 102 does not wish to continue, the mobile application 300 may prompt the consumer 102 to capture the merchant consumable data again as described in step 1004.

In step 1018, as a result of step 1010, if the merchant consumable data is determined to be authentic, merchant consumable data may be inserted in to one of the pre-designated data fields of the data transfer message.

In step 1020, the consumer 102 may tap the mobile device 200 or wave the mobile device 200 in proximity of the access device 106 to make the payment. This may allow transfer of the data transfer message to the payment terminal 106A of the access device 106 using the radio waves.

Steps 1022, 1024, 1026, 1028, 1030, 1032, 1034, 1036, 1038, 1040, 1042, 1044, 1046, 1048 and 1050 of FIGS. 10A-10B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 11A:
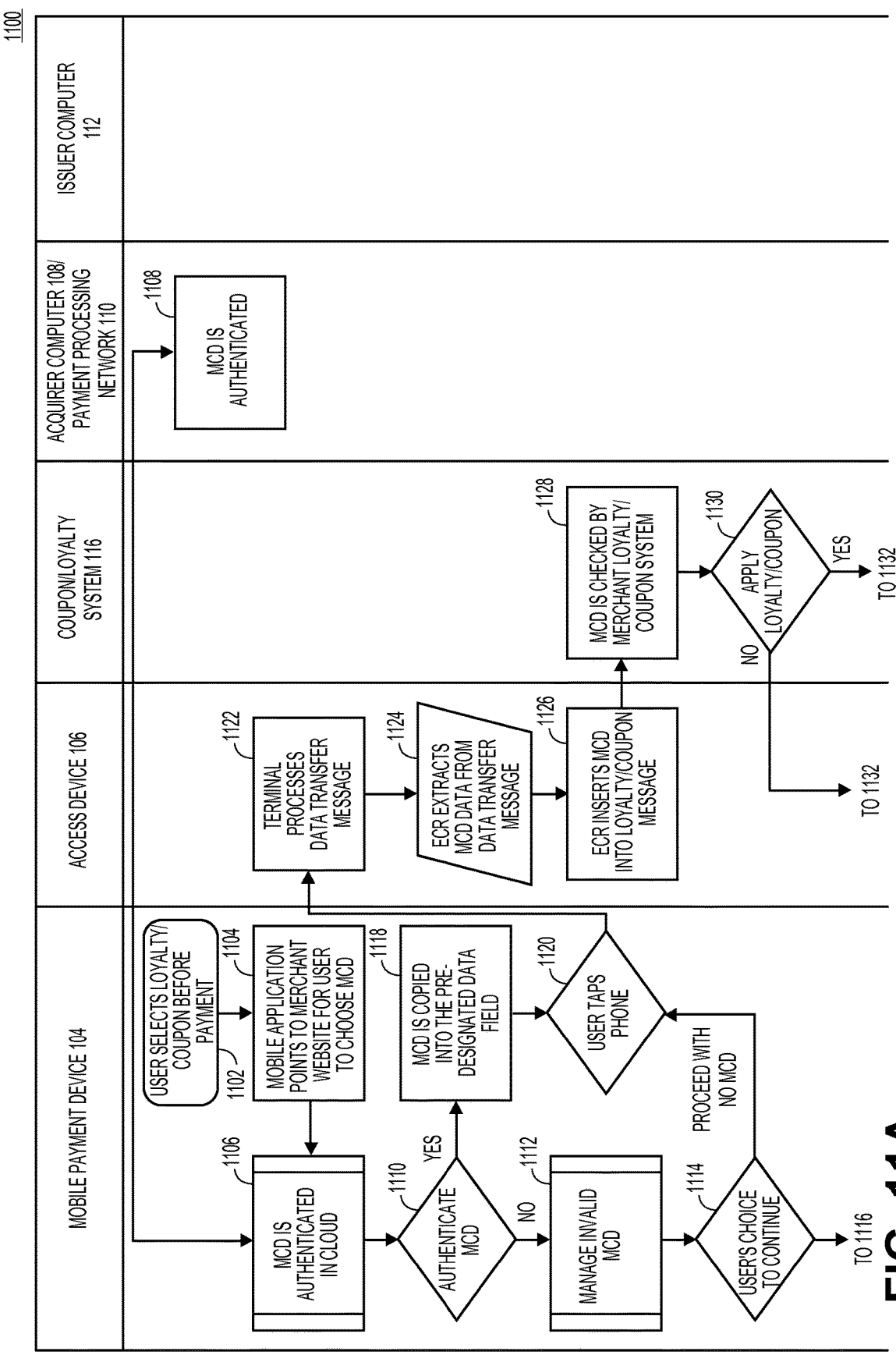
FIGS. 11A-11B illustrate a use case for a payment transaction with the authenticated merchant consumable data downloaded from a merchant website, in one embodiment of the invention.
Figure 11B:
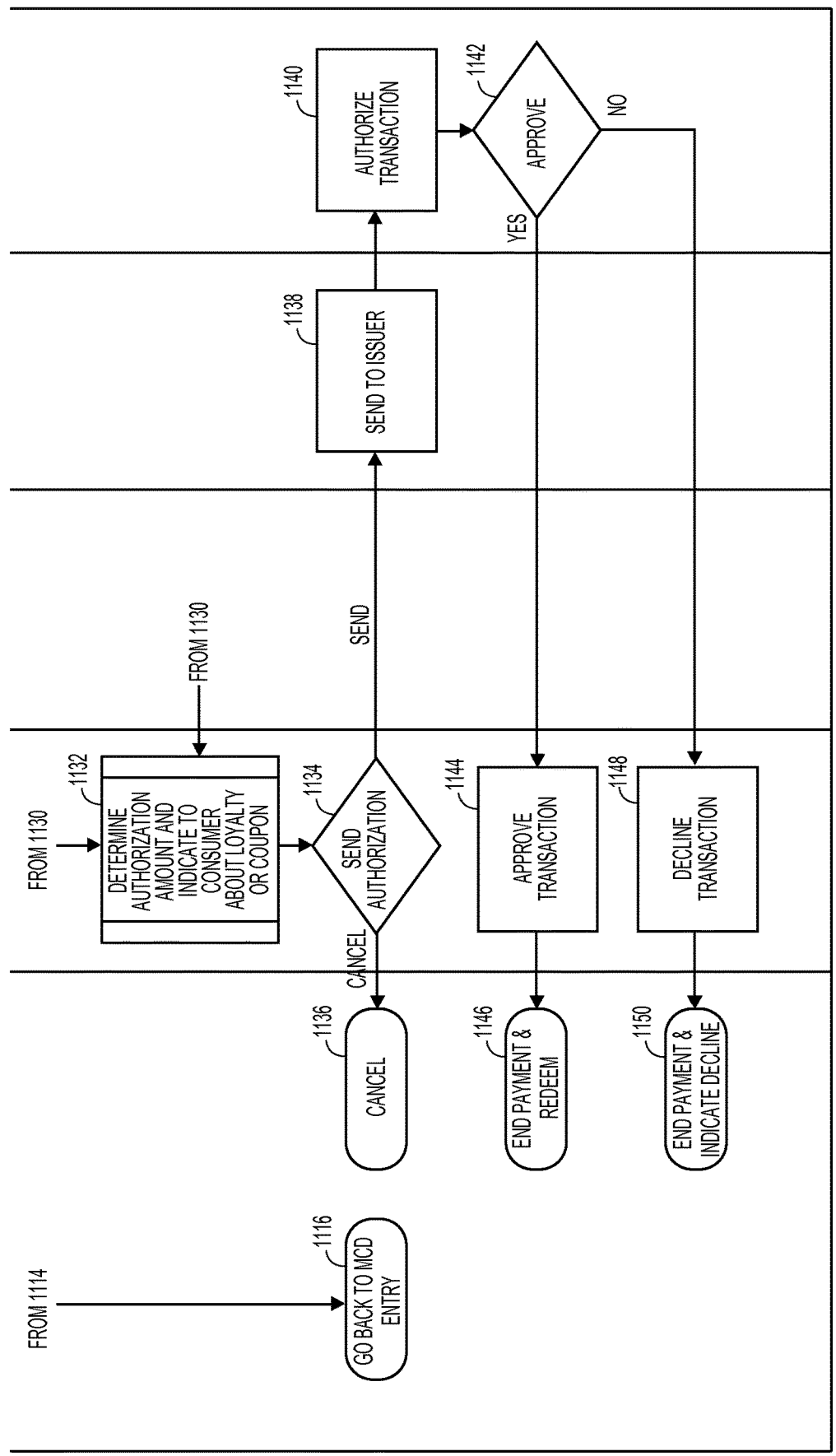

FIGS. 11A-11B illustrate a use case for a payment transaction with the authenticated merchant consumable data downloaded from a merchant website, in one embodiment of the invention.

In step 1102, the consumer 102 may select a coupon or loyalty account before payment. For example, the consumer 102 may launch the mobile application 300 on the mobile device 200.

In step 1104, the mobile application 300 may direct the consumer 102 to a merchant website to download the merchant consumable data to the mobile device 200. For example, the merchant consumable data may be a coupon that may be downloaded from the merchant website using the mobile application 300. As illustrated in FIG. 15A, the mobile application 300 may provide an option to the consumer 102 to download a coupon (1512) using the graphical user interface.

In step 1106, the merchant consumable data may be authenticated before inserting in the data transfer message. In some embodiments, the merchant consumable data may be authenticated by the payment processing network 110 or another entity. For example, referring back to FIG. 1, the mobile device 200 may communicate with the payment processing network 110 via the message gateway 114 and communications network 118 to authenticate the merchant consumable data.

In step 1108, the merchant consumable data may be authenticated by the payment processing network 110. For example, a server computer at the payment processing network 110 may determine if the merchant consumable data is authenticated based on a set of rules.

Steps 1110-1120 of FIG. 11A respectively correspond to the steps 1010-1020 of FIG. 10A, therefore, their description is not repeated. To summarize the flow, if the merchant consumable data is authenticated, the merchant consumable data may be inserted into the data transfer message and passed to the access device 106. If the merchant consumable data is not authenticated, the consumer 102 may download the merchant consumable data again or decide to make the payment without the merchant consumable data.

Steps 1122, 1124, 1126, 1128, 1130, 1132, 1134, 1136, 1138, 1140, 1142, 1144, 1146, 1148 and 1150 of FIGS. 11A-11B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 12A:
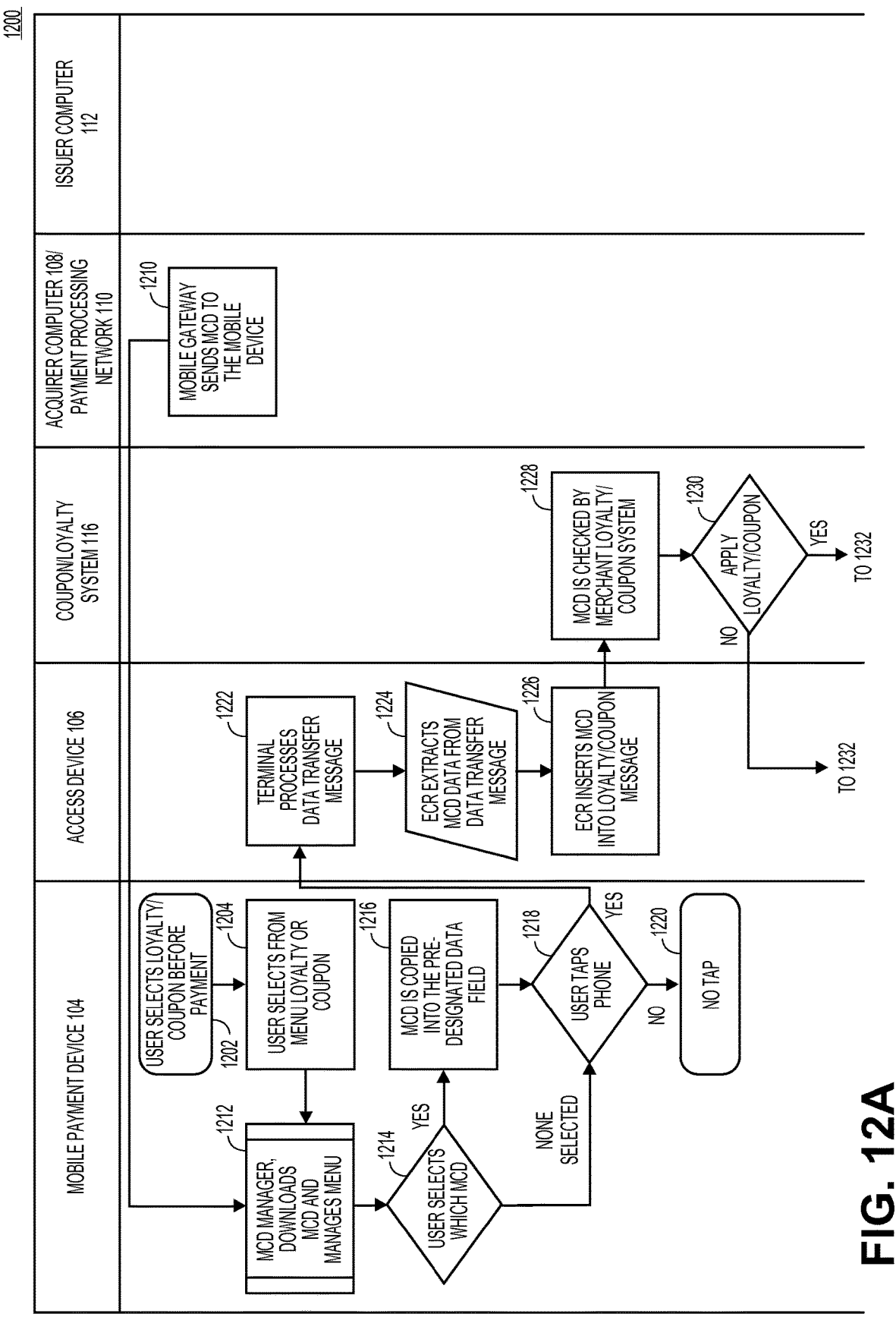
FIGS. 12A-12B illustrate a use case for a payment transaction with the securely managed merchant consumable data via merchant and payment processing network integrated system, in one embodiment of the invention.
Figure 12B:
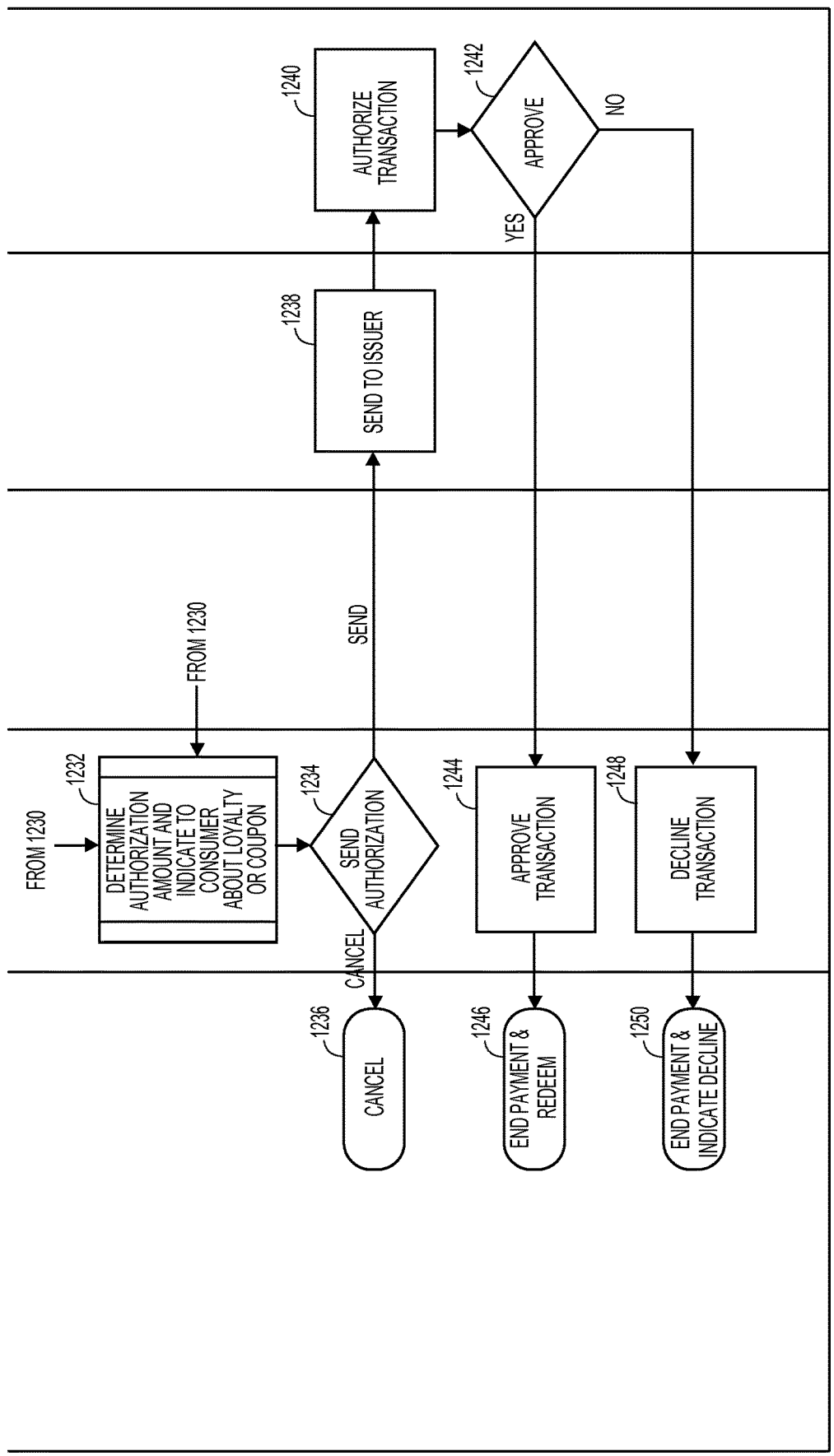

FIGS. 12A-12B illustrate a use case for a payment transaction with the securely managed merchant consumable data via merchant and payment processing network integrated system, according to one embodiment of the invention.

In step 1202, the consumer 102 may select a coupon or loyalty account before payment. For example, the consumer 102 may launch the mobile application 300 on the mobile device 200.

In step 1204, the consumer 102 may select the coupon or loyalty account from a menu provided by the mobile application 300. For example, the MCD manager module may download the merchant consumable data from the payment processing network 110. As illustrated in FIG. 15A, the mobile application 300 may provide an option to the consumer 102 to select a coupon (1504) using the graphical user interface.

In step 1206, the merchant may manage the merchant consumable data. For example, the coupon/loyalty system 116 may manage the coupons or loyalty accounts for the consumer 102. In some embodiments, the coupon/loyalty system 116 may store the coupons and loyalty accounts for each consumer in the database 616.

In step 1208, the MCD manager module 610 may determine the merchant consumable data that may be provided to the mobile device 200 and may send the merchant consumable data to the payment processing network 110. For example, referring back to FIG. 1, the coupon/loyalty system 116 may communicate with the payment processing network 110 and the mobile payment device 104 via the message gateway 114.

In step 1210, the payment processing network 110 may send the merchant consumable data to the mobile device 200. For example, referring back to FIG. 1, the payment processing network 110 may communicate with the mobile device 200 via the message gateway 114.

In step 1212, the MCD manager 310 may download the merchant consumable data from the payment processing network 110. In some embodiments, the MCD manager 310 may download a selection of merchant consumable data on the mobile device 200. The mobile application 300 may present a graphical interface to the consumer 102 to make a selection for the merchant consumable data.

In step 1214, the consumer 102 may select the merchant consumable data from the menu provided by the mobile application 300.

In step 1216, the selected merchant consumable data may be copied into the pre-designated data field of the data transfer message by the mobile application 300.

In step 1218, the consumer 102 may tap the mobile device 200 or wave the mobile device 200 in proximity of the access device 106 to make the payment. This may allow transfer of the data transfer message to the payment terminal 106A of the access device 106 using the radio waves.

In step 1220, if the consumer 102 does not tap the phone, the data transfer message is not passed to the access device 106.

When the consumer taps the phone, the merchant consumable data may be passed from the mobile device 200 to the access device 106 in the data transfer message. Steps 1222, 1224, 1226, 1228, 1230, 1232, 1234, 1236, 1238, 1240, 1242, 1244, 1246, 1248 and 1250 of FIGS. 12A-12B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 13A:
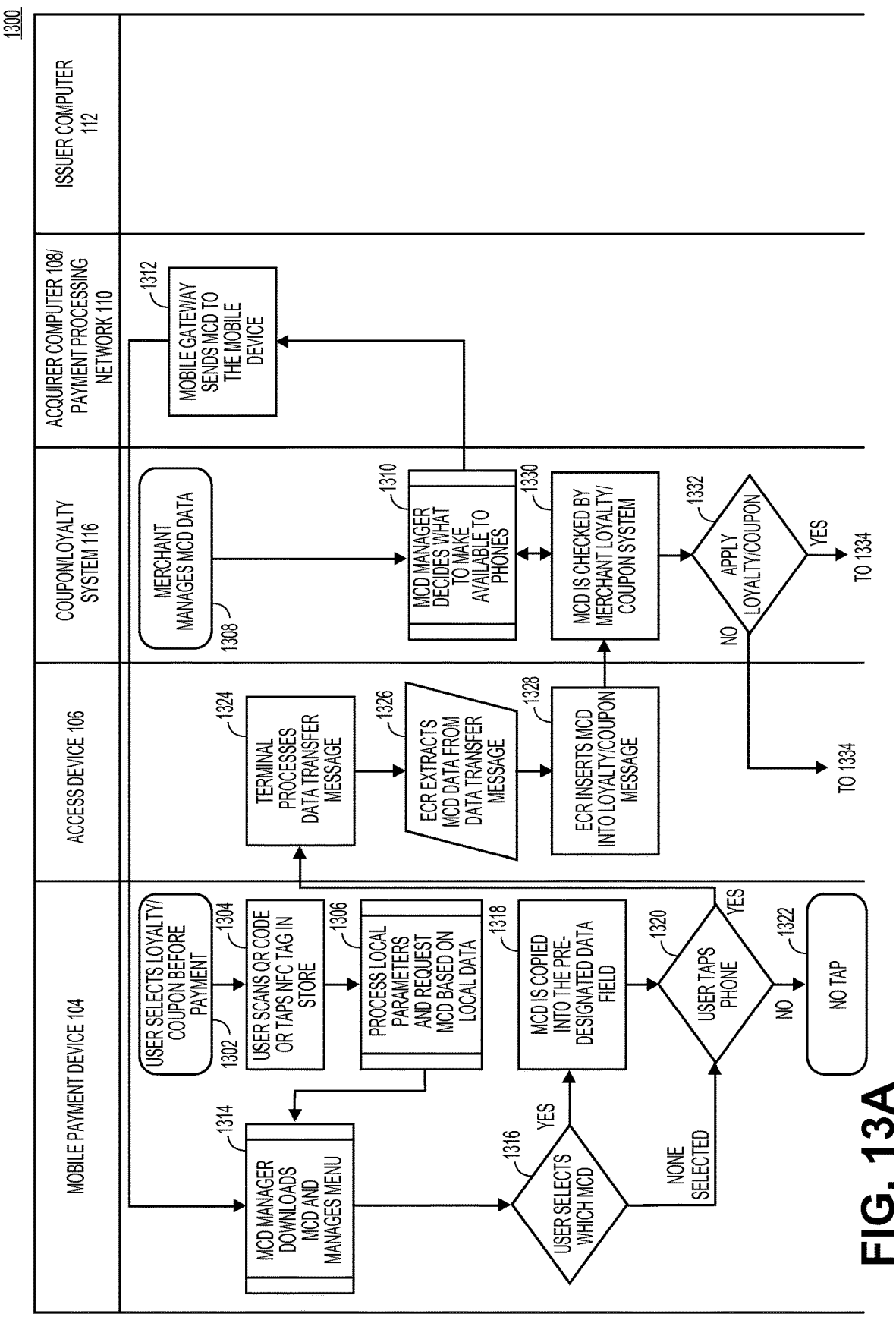
FIGS. 13A-13B illustrate a use case for a payment transaction with the securely managed merchant consumable data via merchant and payment processing network integrated system with local trigger, in one embodiment of the invention.
Figure 13B:
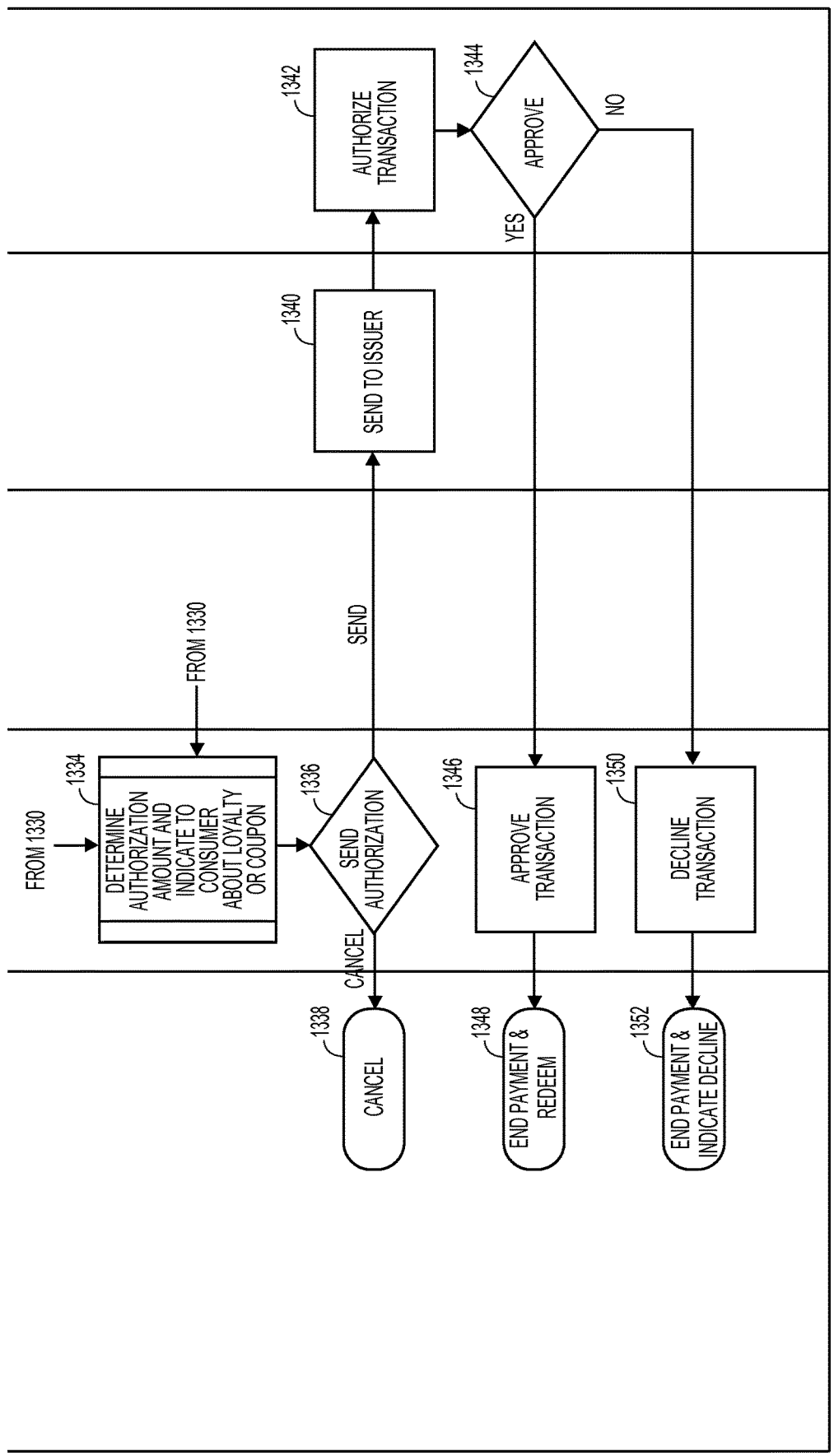

FIGS. 13A-13B illustrate a use case for a payment transaction with the securely managed merchant consumable data via merchant and payment processing network integrated system with a local trigger, in one embodiment of the invention.

In step 1302, the consumer 102 may select a coupon or loyalty account before payment. For example, the consumer 102 may launch the mobile application 300 on the mobile device 200.

In step 1304, the consumer 102 may scan a machine readable code or tap an NFC tag at the merchant location. In some embodiments, the machine readable code or the NFC tag may include location and/or merchant specific information. In some embodiments, the consumer 102 may use the mobile device 200 to scan the machine readable code or tap an NFC tag at the merchant location that may provide an input to the payment processing network 110 via the message gateway 114.

In step 1306, the mobile application 300 may process the machine readable code or the NFC tag and determine the location and/or merchant specific information. The mobile application 300 may request merchant consumable data based on the data captured from the location and/or the merchant specific information.

In step 1308, the merchant may manage the merchant consumable data. For example, the coupon/loyalty system 116 may manage the coupons or loyalty accounts for the consumer 102. In some embodiments, the coupon/loyalty system 116 may customize the coupons for each consumer based on the merchant location. For example, a store in California may have a different discount offered as compared to another store in New York.

In step 1310, the MCD manager 610 may determine the merchant consumable data that may be provided to the mobile device 200 and may send those merchant consumable data to the payment processing network 110 via the message gateway 114.

In step 1312, the payment processing network 110 may send the merchant consumable data to the mobile device 200 via the message gateway 114.

In step 1314, the MCD manager 310 may download the merchant consumable data from the payment processing network 110. In some embodiments, the mobile application 300 may download a range of merchant consumable data based on the location and/or merchant specific information. The mobile application 300 may present a graphical interface to the consumer 102 to make a selection for the merchant consumable data.

In step 1316, the consumer 102 may select the merchant consumable data from the menu using the mobile application 300.

In step 1318, the selected merchant consumable data may be copied into the pre-designated data field of the data transfer message using the mobile application 300.

In step 1320, the consumer 102 may tap the mobile device 200 or wave the mobile device 200 in proximity of the access device 106 to make the payment. This may allow transfer of the data transfer message to the payment terminal 106A of the access device 106 using the radio waves.

In step 1322, if the consumer 102 does not tap the phone, the data transfer message may not be passed to the access device 106.

When the consumer taps the phone, the merchant consumable data may be passed from the mobile device 200 to the access device 106 in the data transfer message. Steps 1324, 1326, 1328, 1330, 1332, 1334, 1336, 1338, 1340, 1342, 1344, 1346, 1348, 1350 and 1352 of FIGS. 13A-13B respectively correspond to the steps 712, 714, 716, 718, 720, 722, 724, 726, 728, 730, 732, 734, 736, 738 and 740 of FIGS. 7A-7B, therefore, their description is not repeated. To summarize the flow, the merchant consumable data may be extracted from the data transfer message by the access device 106 and may be validated by the loyalty/coupon system 116. The coupon or the loyalty points may be applied to the transaction and the transaction may be authorized by the issuer computer 112.

Figure 14A:
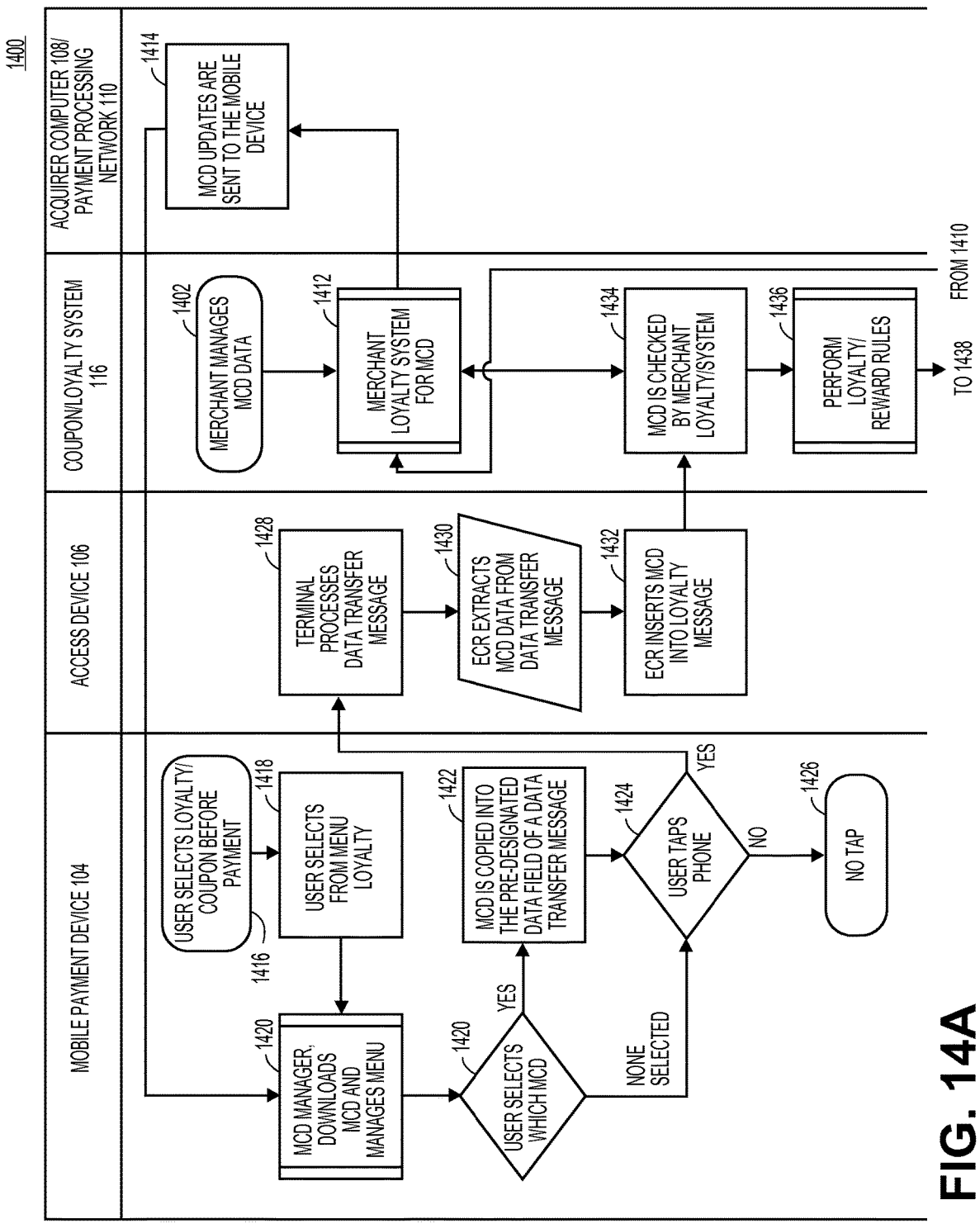
FIGS. 14A-14B illustrate a non-transaction use case of merchant consumable data via merchant and payment processing network integrated system, in one embodiment of the invention.
Figure 14B:
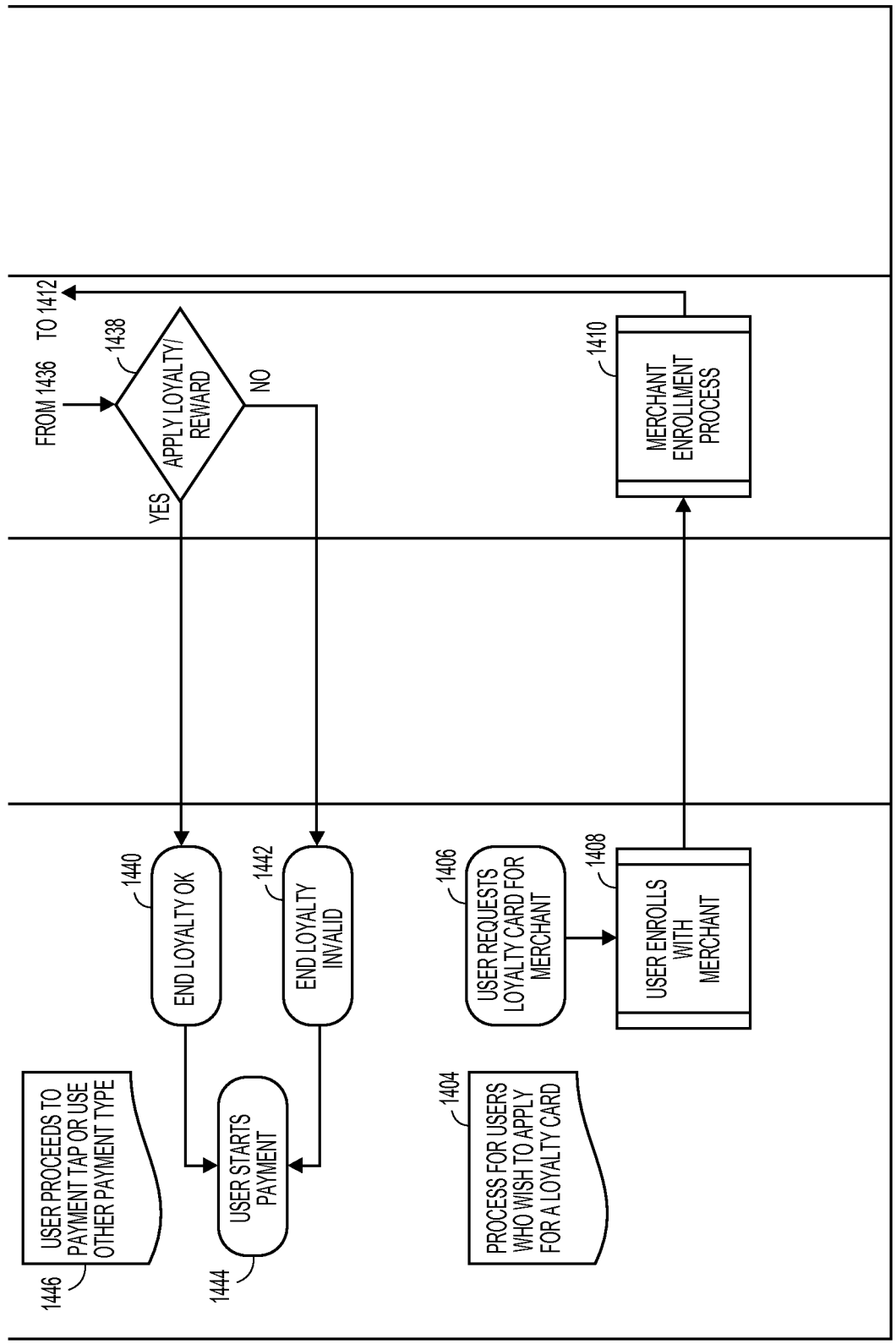

FIGS. 14A-14B illustrates a non-transaction use case of merchant consumable data via merchant and payment processing network integrated system, in one embodiment of the invention.

In step 1402, a merchant may manage the merchant consumable data. For example, the coupon/loyalty system 116 may manage the coupons or loyalty accounts for consumers. In some embodiments, the coupon/loyalty system 116 may allow the consumers to enroll in the loyalty program as described with a process 1404. The process 1404 illustrates the steps for the consumer 102 to apply for a loyalty card.

In step 1406, the consumer 102 may make a request for a loyalty account with a merchant, for example, using the graphical user interface provided by the mobile application 300.

In step 1408, the consumer 102 may enroll with the merchant, for example, using the graphical user interface provided by the mobile application 300. As illustrated in FIG. 15B, the mobile application 300 may provide an option to the consumer 102 to register for a loyalty account (1516) using the graphical user interface.

In step 1410, the merchant may perform the enrollment process to enroll the consumer 102 in the loyalty program. For example, the coupon/loyalty system 116 may provide a loyalty account number to the consumer 102. In some embodiments, the coupon/loyalty system 116 may add the consumer loyalty account information to the database 616.

In step 1412, the merchant loyalty system 116 may send the merchant consumable data to the payment processing network 110 via the message gateway 114.

In step 1414, the payment processing network 110 may send the merchant consumable data updates to the mobile device 200 via the message gateway 114.

In step 1416, the consumer 102 may select a coupon or loyalty account before payment. The consumer 102 may be registered previously with the merchant for a loyalty account. As illustrated in FIG. 15B, the mobile application 300 may provide an option to the consumer 102 to select a loyalty account (1520) using the graphical user interface. In some embodiments, the mobile application 300 may provide an option to the consumer 102 to enter a loyalty account number (1518), e.g., using the touch screen interface.

In step 1418, the consumer 102 may select the loyalty account from the menu provided by the mobile application 300. For example, the consumer 102 may have different loyalty accounts registered with different merchants.

In step 1420, the MCD manager 310 may download the merchant consumable data from the payment processing network 110. In some embodiments, the mobile application 300 may present a menu to the consumer 102 to make a selection for the merchant consumable data. In some embodiments, the mobile application 300 may manage a selection of loyalty products associated with the merchant to display on the mobile device 200. For example, the mobile application 300 may download the updates of the loyalty products from the payment processing network 110 via the message gateway 114.

In step 1420, the consumer 102 may select the merchant consumable data from the menu provided by the mobile application 300.

In step 1422, the selected merchant consumable data may be copied into the pre-designated data field of the data transfer message by the mobile application 300.

In step 1424, the consumer 102 may tap the mobile device 200 or wave the mobile device 200 in proximity of the access device 106 to make the payment. This may allow transfer of the data transfer message to the payment terminal 106A of the access device 106 using the radio waves.

In step 1426, if the consumer 102 does not tap the phone, the data transfer message may not be passed to the access device 106.

In step 1428, the access device 106 may process the data transfer message. For example, the reader 504 of the access device 106 may capture the data transfer message via radio waves. The message decoder module 514 may decode the data transfer message.

In step 1430, the message decoder module 514 may extract the merchant consumable data from the data transfer message. For example, the message decoder module 514 may extract the loyalty account number selected by the consumer 102.

In step 1432, the electronic cash register 106B may insert the merchant consumable data into a loyalty message. For example, the MCD processing module 516 may generate a loyalty message with the loyalty account number and some other information associated with the transaction such as the transaction amount, data and time of the transaction, etc. The access device 106 may transmit the loyalty message to the coupon/loyalty system 116.

In step 1434, the coupon/loyalty system 116 may determine the validity of the loyalty account. For example, the coupon/loyalty system 116 may determine if the loyalty account is active and is registered with the merchant.

In step 1436, the coupon/loyalty system 116 may apply loyalty or reward rules on the loyalty account. For example, the coupon/loyalty system 116 may determine if the points associated with the loyalty account may be used towards the transaction. For example, the points may only be redeemed for the purchase of shoes or at least 50 points may be required to earn free coffee.

In step 1438, the coupon/loyalty system 116 may determine if the loyalty or rewards may be applied towards the transactions.

In step 1440, the coupon/loyalty system 116 may send a message to the mobile device 200 that the loyalty point may be redeemed.

In step 1442, the coupon/loyalty system 116 may send a message to the mobile device 200 that the loyalty point may not be redeemed.

In step 1444, the user may complete the payment process with or without the loyalty points using an available method of payment. For example, as shown by a process 1446, the consumer 102 may perform another tap of the mobile device 200 at the access device 106 or use other payment type. In some embodiments, the consumer 102 may complete the purchase by redeeming the loyalty points. As shown in FIG. 15B, the mobile application 300 may provide an option to the consumer 102 to select redemption option (1524). In some embodiments, the mobile application 300 may provide an option to the consumer 102 to view loyalty points before making a selection (1522).

The various participants and elements described herein with reference to FIG. 1, may operate one or more computer apparatuses to facilitate the functions described herein. Any of the elements in FIG. 1 including any servers or databases, may use any suitable number of subsystems to facilitate the functions described herein.

Figure 16:
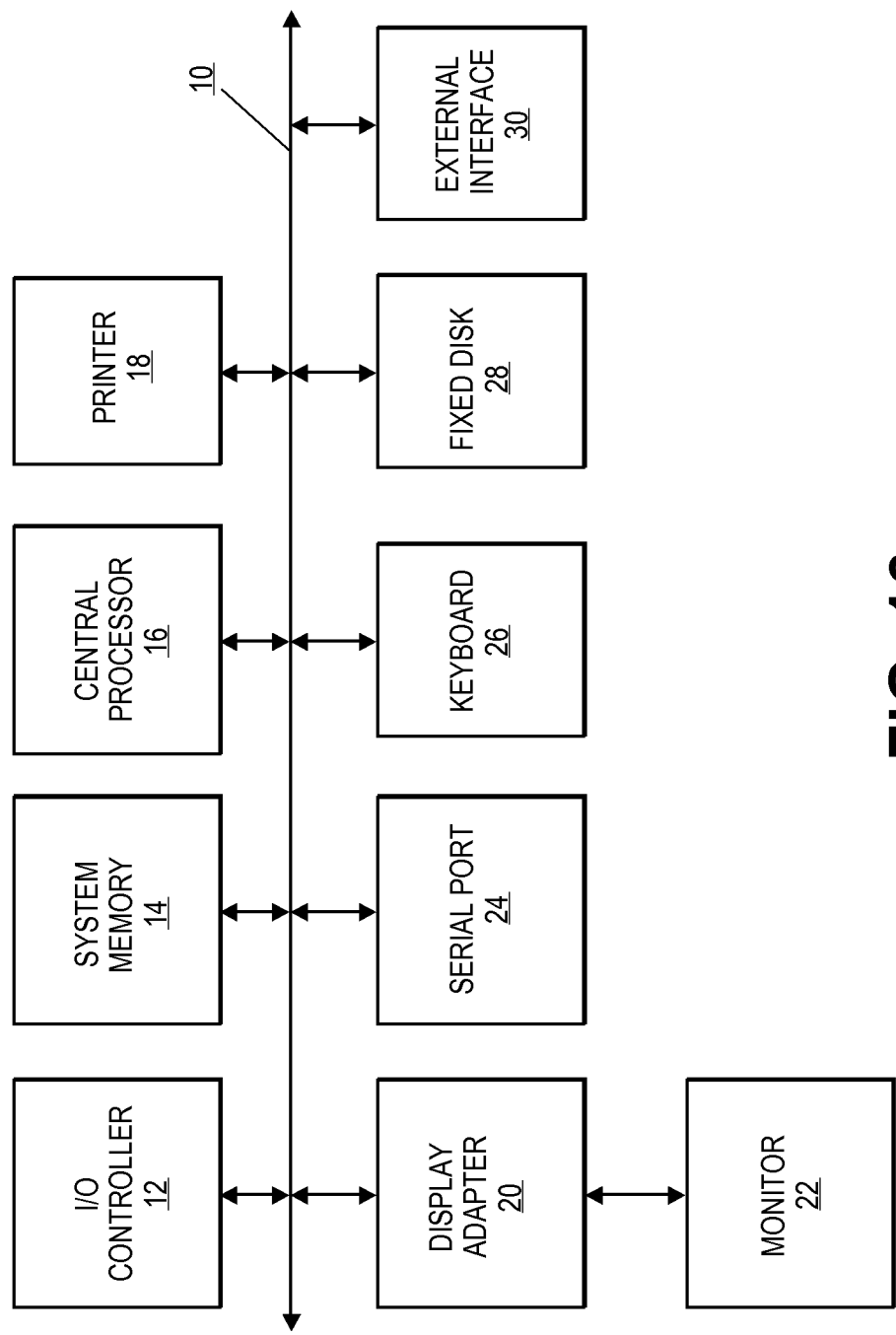
FIG. 16 illustrates a block diagram of a computer apparatus.

Examples of such subsystems or components are shown in FIG. 16. The subsystems shown in FIG. 16 are interconnected via a system bus 10. Additional subsystems such as a printer 30, keyboard 18, fixed disk 20 (or other memory comprising computer readable media), monitor 12, which is coupled to display adapter 14, and others are shown. Peripherals and input/output (I/O) devices, which couple to I/O controller 24 (which can be a processor or other suitable controller), can be connected to the computer system by any number of means known in the art, such as serial port 16. For example, serial port 16 or external interface 22 can be used to connect the computer apparatus to a wide area network such as the Internet, a mouse input device, or a scanner. The interconnection via system bus allows the central processor 28 to communicate with each subsystem and to control the execution of instructions from system memory 26 or the fixed disk 20, as well as the exchange of information between subsystems. The system memory 26 and/or the fixed disk 20 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
   determining, by a processor in a mobile payment device, merchant consumable data including a coupon code or loyalty data;
   generating, by the processor, a data transfer message, the data transfer message comprising a plurality of pre-designated data fields comprising an account identifier data field comprising an account number, an expiration date data field, a cryptogram data field, a service code data field, a consumer name data field, and an issuer application data data field;
   inserting, by the processor, the merchant consumable data into the consumer name data field; and
   providing, by the processor, the data transfer message to an access device,
   wherein the access device is configured to extract the merchant consumable data from the data transfer message and process the merchant consumable data, by determining a transaction amount for a transaction;

applying a discount associated with the merchant consumable data to the transaction;
generating a discounted amount for the transaction;
generating an authorization request message comprising the discounted amount for the transaction; and
transmitting the authorization request message to an issuer of an account associated with the mobile payment device.

2. The method of claim 1, wherein the mobile payment device is a mobile phone.

3. The method of claim 1, wherein the access device comprises a payment terminal with a reader and an electronic cash register coupled to the payment terminal.

4. A method of claim 1, wherein the merchant consumable data is authenticated prior to inserting the merchant consumable data into the consumer name data field.

5. The method of claim 1 wherein the mobile payment device comprises a user interface module, and wherein the method further comprises:
receiving, by the user interface module, a selection of the merchant consumable data and a selection of an account that is identified by the account number, before generating the data transfer message.

6. The method of claim 1 further comprising:
authenticating the merchant consumable data by the mobile payment device prior to inserting the merchant consumable data into the consumer name data field.

7. The method of claim 1 further comprising:
sending, by the mobile payment device, the merchant consumable data to a payment processing network or an acquirer computer, whereby the merchant consumable data is authenticated by the payment processing network or the acquirer computer by validating a digital signature associated with the merchant consumable data, prior to inserting the merchant consumable data into the consumer name data field, wherein the mobile payment device is a mobile phone; and
receiving, by the mobile payment device, an authentication result for the merchant consumable data.

8. The method of claim 1, wherein the method further comprises, prior to inserting the merchant consumable data into the consumer name data field:
determining, by the processor and a merchant consumable data insertion module, that the merchant consumable data does not meet a size requirement of the consumer name data field; and
adjusting, by the processor, the merchant consumable data, so that the merchant consumable data fits within the consumer name data field.

9. A mobile payment device comprising:
a processor; and
a computer readable medium comprising code, executable by the processor, for implementing a method comprising:
determining merchant consumable data comprising a coupon code or loyalty data;
generating a data transfer message, the data transfer message comprising a plurality of pre-designated data fields comprising an account identifier data field comprising an account number, an expiration date data field, a cryptogram data field, a service code data field, a consumer name data field, and an issuer application data data field;
inserting the merchant consumable data into the consumer name data field; and
providing the data transfer message to an access device,
wherein the access device is configured to extract the merchant consumable data from the data transfer message and process the merchant consumable data, by
determining a transaction amount for a transaction;
applying a discount associated with the merchant consumable data to the transaction;
generating a discounted amount for the transaction;
generating an authorization request message comprising the discounted amount for the transaction; and
transmitting the authorization request message to an issuer of an account associated with the mobile payment device.

10. The mobile payment device of claim 9, wherein the mobile payment device is a mobile phone.

11. The mobile payment device of claim 9, wherein the mobile payment device is a payment card.

12. The mobile payment device of claim 9, wherein the merchant consumable data is authenticated prior to inserting the merchant consumable data into the consumer name data field.

13. A method comprising:
receiving, by a processor, a data transfer message from a mobile payment device, wherein the data transfer message comprises merchant consumable data comprising a coupon code or loyalty data, and a plurality of pre-designated data fields comprising an account identifier data field comprising an account number, an expiration date data field, a cryptogram data field, a service code data field, a consumer name data field, and an issuer application data data field, wherein the merchant consumable data is in the consumer name data field;
extracting, by the processor, the merchant consumable data; and
processing, by the processor, the merchant consumable data,
wherein processing, by the processor, the merchant consumable data comprises:
determining, by the processor, a transaction amount for a transaction;
applying, by the processor, a discount associated with the merchant consumable data to the transaction;
generating, by the processor, a discounted amount for the transaction;
generating, an authorization request message comprising the discounted amount for the transaction; and
transmitting the authorization request message to an issuer of an account associated with the mobile payment device.

14. The method of claim 13 wherein the processor is in an access device, wherein the access device comprises a payment terminal with a contactless reader and an electronic cash register coupled to the payment terminal.

15. The method of claim 13 wherein the consumer name data field has a fixed length and wherein the coupon code or loyalty data has a number of characters less than the fixed length, and wherein a remainder of the consumer name data field is filled with predetermined values.

16. The method of claim 13 wherein processing, by the processor, the merchant consumable data further comprises:
receiving, an authorization response message from the issuer of the account in response to the transmission of the authorization request message.

17. The method of claim 13, wherein the method further comprises, prior to inserting the merchant consumable data into the consumer name data field:

generating and transmitting, by the processor, a merchant consumable data validation message to a coupon/loyalty system, the coupon/loyalty system determining that the merchant consumable data is valid and transmitting a validation response message indicating that the merchant consumable data is valid; and receiving, by the processor, the validation response message indicating the merchant consumable data is valid.

18. The method of claim 17 wherein the merchant consumable data includes a digital signature, and wherein determining that the merchant consumable data is valid comprises verifying that the digital signature is valid.

19. A device comprising:

a processor; and a computer readable medium comprising code, executable by the processor, for implementing a method comprising:

receiving a data transfer message from a mobile payment device, wherein the data transfer message comprises merchant consumable data comprising a coupon code or loyalty data, and a plurality of pre-designated data fields comprising an account identifier data field comprising an account number, an expiration date data field, a cryptogram data field, a service code data field, a consumer name data field, and an issuer application data data field, wherein the merchant consumable data is in the consumer name data field;

extracting the merchant consumable data; and processing the merchant consumable data, wherein processing the merchant consumable data comprises:

determining a transaction amount for a transaction;

applying a discount associated with the merchant consumable data to the transaction;

generating a discounted amount for the transaction;

generating an authorization request message comprising the discounted amount for the transaction; and transmitting the authorization request message to an issuer of an account associated with the mobile payment device.

20. The device of claim 19 wherein the device is an access device and wherein the access device comprises a payment terminal with a contactless reader and an electronic cash register coupled to the payment terminal.

* * * * *